US012715780B2

(12) United States Patent
Pang et al.

(10) Patent No.: US 12,715,780 B2
(45) **Date of Patent: *Aug. 25, 2026**

(54) LEAD SULFIDE NANOCRYSTALS, PREPARATION METHOD AND USES THEROF

(71) Applicant: Quantum Science Ltd, Daresbury (GB)

(72) Inventors: Hao Pang, Trafford (GB); Cong-Duan Vo, Altrincham (GB); Jie Li, Stockport (GB)

(73) Assignee: Quantum Science LTD, Daresbury (GB)

(*) Notice: Subject to any disclaimer, the term of this patent is extended or adjusted under 35 U.S.C. 154(b) by 506 days.

This patent is subject to a terminal disclaimer.

(21) Appl. No.: 18/026,417

(22) PCT Filed: Sep. 24, 2021

(86) PCT No.: PCT/GB2021/052482
§ 371 (c)(1),
(2) Date: Mar. 15, 2023

(87) PCT Pub. No.: WO2022/064205
PCT Pub. Date: Mar. 31, 2022

(65) Prior Publication Data

US 2023/0382757 A1 Nov. 30, 2023

(30) Foreign Application Priority Data

Sep. 24, 2020 (GB) ..................................... 2015102

(51) Int. Cl.
*C01G 21/21* (2006.01)
*B82Y 20/00* (2011.01)
(Continued)

(52) U.S. Cl.
CPC ............. *C01G 21/21* (2013.01); *C01G 21/02* (2013.01); *C09K 11/661* (2013.01); *B82Y 20/00* (2013.01);
(Continued)

(58) Field of Classification Search
CPC ...... C01G 21/21; C01G 21/02; C09K 11/661; B82Y 20/00; B82Y 30/00; B82Y 40/00
See application file for complete search history.

(56) References Cited

U.S. PATENT DOCUMENTS 9,099,663 B1 8/2015 Chuang et al.
2016/0237345 A1 8/2016 Owen et al.
(Continued)

FOREIGN PATENT DOCUMENTS

CN 101844801 A 9/2010
CN 103413892 A 11/2013
(Continued)

OTHER PUBLICATIONS

Biondi et al., "Facet-Oriented Coupling Enables Fast and Sensitive Colloidal Quantum Dot Photodetectors," Advanced Materials 33: 11 pages (2021).

(Continued)

*Primary Examiner* — Anthony J Zimmer
(74) *Attorney, Agent, or Firm* — FOLEY HOAG LLP

(57) ABSTRACT

The present invention provides the use of a lead (IV) containing compound to prepare a lead chalcogenide nanocrystal and a method for producing broadband lead chalcogenide nanocrystals in a low cost, size-controllable and scalable method, the method comprising contacting a lead (IV) containing compound with an organic acid and a chalcogen-containing reagent.

11 Claims, 8 Drawing Sheets

(51) Int. Cl.

| | |
|---|---|
| ***B82Y 30/00*** | (2011.01) |
| ***B82Y 40/00*** | (2011.01) |
| ***C01G 21/02*** | (2006.01) |
| ***C09K 11/66*** | (2006.01) |

(52) U.S. Cl.

CPC ............... *B82Y 30/00* (2013.01); *B82Y 40/00* (2013.01); *C01P 2002/01* (2013.01); *C01P 2004/38* (2013.01); *C01P 2004/52* (2013.01); *C01P 2004/64* (2013.01); *C01P 2006/60* (2013.01); *C01P 2006/80* (2013.01)

(56) References Cited

U.S. PATENT DOCUMENTS

| | | | |
|---|---|---|---|
| 2017/0271604 | A1 | 9/2017 | Brown et al. |
| 2019/0006541 | A1 | 1/2019 | So et al. |

FOREIGN PATENT DOCUMENTS

| | | | | |
|---|---|---|---|---|
| CN | 106433634 A | | 2/2017 | |
| CN | 106753357 A | | 5/2017 | |
| CN | 108483412 A | | 9/2018 | |
| GB | 2582707 B | | 1/2023 | |
| WO | WO-2008087684 A1 | * | 7/2008 | ............ H01M 10/54 |

OTHER PUBLICATIONS

Cademartiri et al., "Multigram Scale, Solventless, and Diffusion-Controlled Route to Highly Monodisperse PbS Nanocrystals," J. Phys. Chem. B. 110(2): pp. 671-673 (2006).

Hendricks et al., "A tunable library of substituted thiourea precursors to metal sulfide nanocrystals," Science Magazine 348(6420): pp. 1226-1230 (2015).

Hines et al., "Colloidal PbS Nanocrystals with Size-Tunable Near-Infrared Emission: Observation of Post-Synthesis Self-Narrowing of the Particle Size Distribution," Advanced Materials 15(21): pp. 1844-1849 (2003).

International Search Report and Written Opinion for International Application No. PCT/GB2021/052482 dated Jan. 20, 2022.

Liu et al., "Reduction of lead dioxide with oxalic acid to prepare lead oxide as the positive electrode material for lead acid batteries," RSC Adv. 6: 10 pages (2016).

Pietryga et al., "Utilizing the Lability of Lead Selenide to Produce Heterostructured Nanocrystals with Bright, Stable Infrared Emission," Journal of the American Chemical Society 130(14): pp. 4879-4885 (2008).

Tan et al., "Facet-Dependent Electrical Conductivity Properties of PbS Nanocrystals," Chem. Mater. 28: pp. 1574-1580 (2016).

* cited by examiner

Scheme 1

Lead (IV) + OA + (ODE)

Degas at 100°C
Heat to required temperature (230°C-250°C)

Lead oleate in ODE

Cool to 100°C
Inject varying TMS solution in ODE and leave reaction for 7 min

Short λ PbS in ODE

Maintain reaction at 100°C
Inject TMS or TAA solution in ODE and leave reaction for 5min
Repeat TMS injection every 5 min until obtaining required λ

Target λ PbS in ODE

Maintain to 60°C
Inject 0.19M halide salt solution in methanol
Stir for 30min-60min then purify (3xMeOH and 1x acetone wash)

Halide-treated PbS dots

FIG. 13

LEAD SULFIDE NANOCRYSTALS, PREPARATION METHOD AND USES THEROF

This application is the U.S. National Stage of International Application No. PCT/GB2021/052482, filed Sep. 24, 2021, which claims the benefit of GB Application No. 2015102.3, filed Sep. 24, 2020. The entire teachings of the above applications are incorporated herein by reference.

FIELD

The present invention relates in general to lead chalcogenide nanocrystals. In particular, the present invention relates to a method for producing lead chalcogenide nanocrystals using a lead (IV) containing compound. The present invention also extends to lead chalcogenide nanocrystals obtained by the method and to uses of the lead chalcogenide nanocrystals.

BACKGROUND

Nanocrystals are useful in a wide range of applications, for example because their optical properties can be finely tuned to provide the desired properties. The optical properties (for example light absorption and emission characteristics) of nanocrystals can be finely tuned by controlling their size. The largest nanocrystals produce the longest wavelengths (and lowest frequencies), while the smallest nanocrystals product shorter wavelengths (and higher frequencies). The size of the nanocrystals may be controlled by means of the method by which they are produced. This ability to finely tune the optical properties of the nanocrystals, by controlling their size, makes nanocrystals suitable for use in a wide range of applications, including, for example, photodetectors, sensors, solar cells, bio-imaging and bio-sensing, photovoltaics, displays, lighting, security and counterfeiting, batteries, wired high-speed communications, quantum dot (QD) lasers, photocatalysts, spectrometers, injectable compositions, field-effect transistors, light-emitting diodes, lasers, photonic or optical switching devices, hydrogen production and metamaterials.

Lead nanocrystals are known, as are various methods for producing them. For example, Hines et al., Adv. Mater. 2003, 15, No. 21, 1844-1849 discloses a method for preparing lead-sulphide nanocrystals that have bandgaps that are tuneable throughout the near-infrared (for example 800 to 1800 nm). The lead-sulphide nanocrystals may be prepared by reacting lead (II) oxide (PbO) with oleic acid to form lead oleate, which is then reacted with bis(trimethylsilyl)sulphide. However, the reaction described in Hines et al. was found to be difficult to control on a large scale. Thus, the method disclosed in Hines et al. is unsuitable for large scale production of lead nanocrystals.

Cademartiri et al., J. Phys. Chem. B., vol. 110, no. 2, 2006, 671-673 discloses a method for preparing lead-sulphide nanocrystals in which lead chloride ($PbCl_2$) is reacted with oleylamine and elemental sulphur. The nanocrystals obtained by this method were difficult to purify and demonstrated a limited peak absorption of 1245 to 1625 nm. Residual lead chloride remaining on the lead-sulphide nanocrystals typically precipitates over long periods of time, making it difficult to produce highly pure lead-sulphide nanocrystals from lead chloride. Thus, the method disclosed in Cademartiri et al. is unsuitable for producing pure and highly monodispersed lead-sulphide nanocrystals on a large scale.

Hendricks et al., Science, 2015, 348, 1226-1230 discloses a method for preparing lead-sulphide nanocrystals in which lead oleate is reacted with a reactive disubstituted thiourea. The lead-sulphide nanocrystals prepared by this method exhibited an absorption peak of 850 to 1800 nm. This method is complex to conduct on a large scale as the size (and absorption) of the nanocrystals is controlled by altering the side chains of the thiourea reactants.

Liu et al, "Reduction of lead dioxide with oxalic acid to prepare lead oxide as the positive material for lead batteries", RAS Adv., 2016, 6, 108513-108522 discloses the reduction of lead (IV) to prepare lead (II) oxide as an anodic material for lead batteries.

Thus, whilst several methods for producing lead chalcogenide nanocrystals are known, these methods fail to allow for ready control of crystal size and therefore the fine tuning of the optical properties of the nanocrystals. The known methods also typically fail to provide nanocrystals exhibiting a broad absorption range. Additionally, the known methods are unsuitable for preparing lead chalcogenide nanocrystals on a large (for example commercially useful) scale.

There is, therefore, a desire to find alternative methods for preparing lead chalcogenide nanocrystals that can be used on a large (for example commercially useful) scale and/or that enable the ready control of the size of the nanocrystals prepared so as to enable fine tuning of the optical properties of the nanocrystals. It is also desired to provide methods that provide lead chalcogenide nanocrystals that exhibit a broad absorption range. It is believed that such a method would provide lead chalcogenide nanocrystals that are suitable for use in a wide range of applications.

SUMMARY

According to a first aspect of the present invention there is provided the use of a lead (IV) containing compound as a starting material to prepare a lead chalcogenide nanocrystal or a lead chalcogenide nanocrystal composition, wherein the lead (IV) constitutes at least 50 molar % of all the lead present in the lead compound starting material, preferably greater than 75 molar %, preferably greater than 90 molar %, preferably greater than 95 molar %. Preferably no lead (II) oxide is present in the starting material. Preferably no lead (II) compounds are present in the starting material.

According to a second aspect of the present invention, there is provided the use of lead (IV) oxide as a starting material to prepare a lead chalcogenide nanocrystal or a lead chalcogenide nanocrystal composition, wherein the molar ratio of lead (IV) oxide to any lead (II) oxide present is greater than 1:1, preferably greater than 2:1, preferably greater than 3:1, preferably greater than 5:1, preferably greater than 10:1, preferably greater than 20:1. Preferably no lead (II) oxide is present in the starting material. Preferably no lead (II) containing compounds are present in the starting material.

According to a third aspect of the present invention, there is provided a method for preparing a lead chalcogenide nanocrystal or a lead chalcogenide nanocrystal composition, the method comprising contacting a lead (IV) containing compound starting material with an organic acid and a chalcogen-containing reagent, wherein the molar ratio of lead (IV) containing compound to any lead (II) containing compounds present is greater than 1:1, preferably greater than 2:1, preferably greater than 3:1, preferably greater than 5:1, preferably greater than 10:1, preferably greater than 20:1. Preferably no lead (II) oxide is present in the starting material. Preferably no lead (II) containing compounds are present in the starting material.

According to a fourth aspect of the present invention, there is provided method for preparing a lead chalcogenide nanocrystal or a lead chalcogenide nanocrystal composition, the method comprising contacting lead (IV) oxide as a starting material with an organic acid and a chalcogen-containing reagent, wherein the molar ratio of lead (IV) oxide to lead (II) oxide present is greater than 1:1, preferably greater than 2:1, preferably greater than 3:1, preferably greater than 5:1, preferably greater than preferably greater than 20:1. Preferably no lead (II) oxide is present in the starting material. Preferably no lead (II) containing compounds are present in the starting material.

According to a fifth aspect of the present invention, there is provided a composition of lead chalcogenide nanocrystals obtained by the method according to the third or fourth aspect of the present invention.

According to a sixth aspect of the present invention, there is provided a film comprising the composition of nanocrystals according to the fifth aspect of the present invention.

According to a seventh aspect of the present invention, there is provided a system or composition, such as a photodetector, sensor, solar cell, bio-imaging or bio-sensing composition, photovoltaic system, display, battery, laser, photocatalyst, spectrometer, injectable composition, field-effect transistor, light-emitting diode, photonic or optical switching device, or metamaterial comprising the composition according to the fifth aspect of the present invention.

According to an eighth aspect of the present invention, there is provided a lead chalcogenide nanocrystal composition, said nanocrystals having a mean particle size of greater than 5 nm, in the range of preferably 6 to 25 nm, in the range of 7 to 20 nm, preferably 8 to 15 nm, and a relative size dispersion of less than 25%, preferably less than 15%, preferably less than 10%.

The nanocrystal compositions according to the eighth aspect of the invention preferably exhibit absorption wavelength in the range of 500 to 4500 nm, preferably suitably in the range of 500 to 2400 nm, preferably suitably in the range of 950 to 1600 nm, preferably in the range of 1350 to 1600 nm.

The nanocrystal compositions according to the eighth aspect of the invention preferably exhibit emission wavelength in the range of 600 to 4500 nm, preferably suitably in the range of 600 to 2500 nm, preferably suitably in the range of 950 to 1600 nm, preferably in the range of 1350 to 1600 nm.

The nanocrystal compositions according to the eighth aspect of the invention preferably exhibit absorption full width at half maximum (FWHM) values of less than 150 nm, preferably less than 130 nm, preferably less than 115 nm, preferably less than 105 nm. Preferably, the FWHM range is in the range of 75-150 nm, preferably 80-130 nm, preferably 85-110 nm, preferably 90-105 nm.

The nanocrystal compositions according to the eighth aspect of the invention preferably exhibit emission full width at half maximum (FWHM) values of less than 150 nm, preferably less than 130 nm, preferably less than 110 nm, preferably less than 105 nm. Preferably, the FWHM range is in the range of 75-150 nm, preferably 80-130 nm, preferably 85-110 nm, preferably 90-105 nm.

The nanocrystal compositions according to the eighth aspect of the invention preferably exhibit quantum yield (QY) values of greater than 10%, preferably greater than 20%, preferably greater than 40%, preferably greater than 50%.

According to the first to eighth aspects of the invention, preferably the lead chalcogenide nanocrystal or a lead chalcogenide nanocrystal composition comprises PbS, PbSe, PbTe or mixtures thereof, more preferably PbS or PbSe, most preferably PbS.

Surprisingly, the methods of the present invention are capable of producing nanocrystals and compositions having improved electronic properties to those produced using mixed lead (II, IV) starting materials (specifically $Pb_3O_4$), such as those disclosed in co-pending application PCT/EP20201058346, filed on 25 Mar. 2020, the teaching of which is incorporated herein by reference. This is surprising as at comparable absorption wavelengths, the nanocrystals of the present invention exhibit a better P/V ratio (peak to valley).

It was also surprising that the method of the present invention was capable of producing nanocrystals which exhibited predominantly cubic structure which also show high crystallinity. This has not previously been observed for lead chalcogenide nanocrystals, and may be a structural feature which contributes to the improved p/v ratio.

BRIEF DESCRIPTION OF DRAWINGS

For a better understanding of the invention, and to show how exemplary embodiments of the same may be carried into effect, reference will be made, by way of example only, to the accompanying diagrammatic Figures, in which.

in air indicating Pb (IV) and Pb (II,IV) based-PbS nanocrystals show comparable thermal stability as Pb (II) based-PbS nanocrystals.

Figure 10:
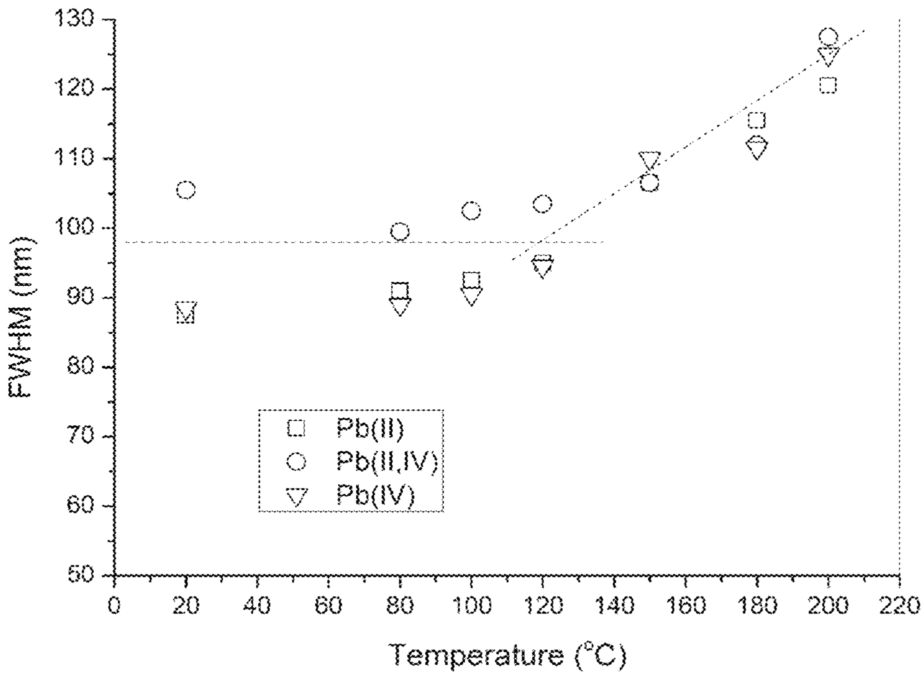

FIG. 10 shows the FWHM of PbS nanocrystal films upon heating at different temperature. The nanocrystals were prepared from Pb (II), Pb (IV), Pb (II, IV) lead source and $(TMS)_2S$ multiple addition. No significant FWHM broadening was observed upon being heated to 120° C. in air for all films indicating Pb (IV) and Pb (II,IV) based-PbS nanocrystals show comparable thermal stability as Pb (II) based-PbS nanocrystals.

Figure 11:
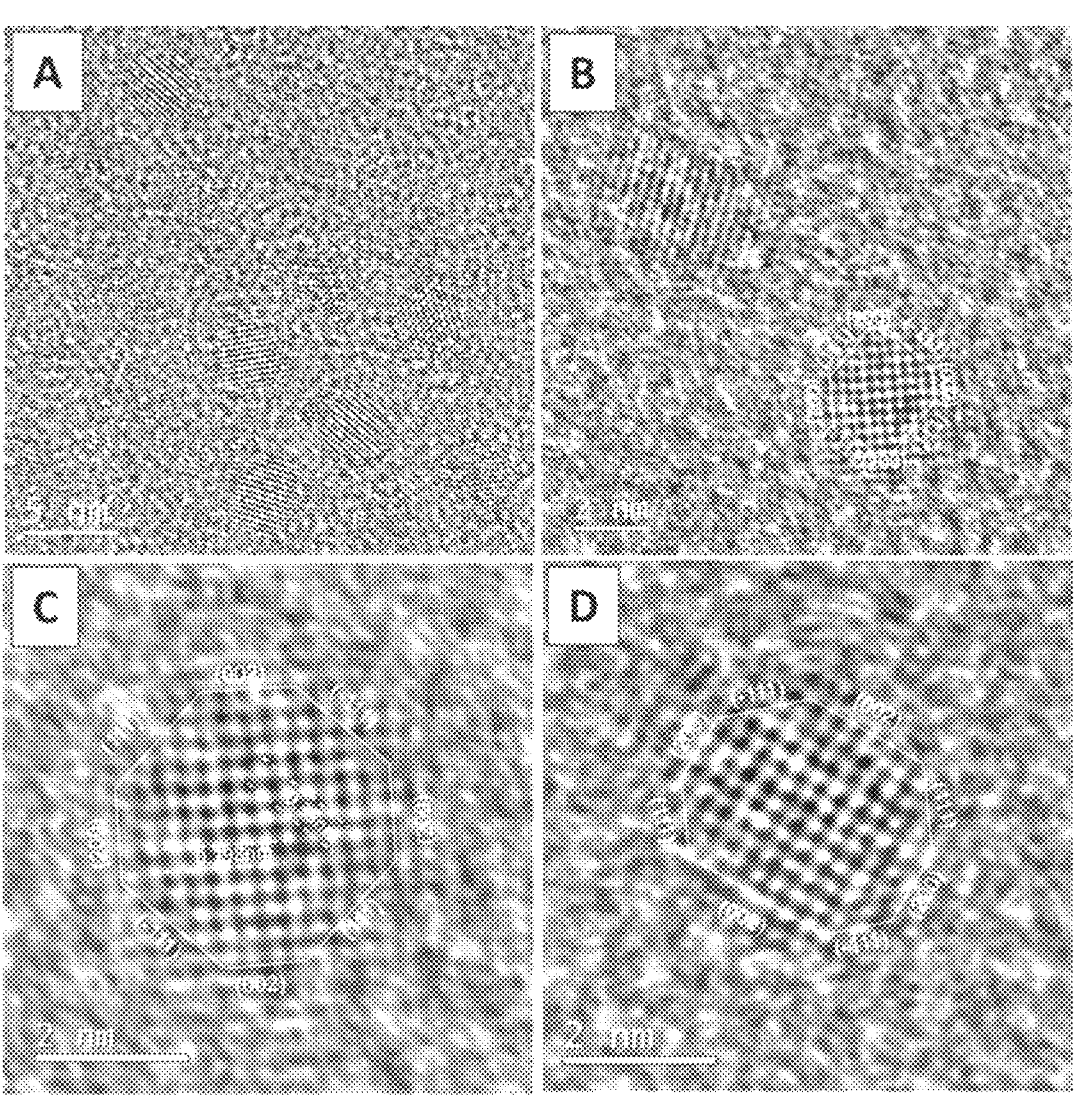

FIG. 11 shows a HRTEM image of PbS quantum dots made from lead (II) oxide precursors. The quantum dots appear in truncated octahedral crystals. (002), (111) and (-111) facets are visible.

Figure 12:
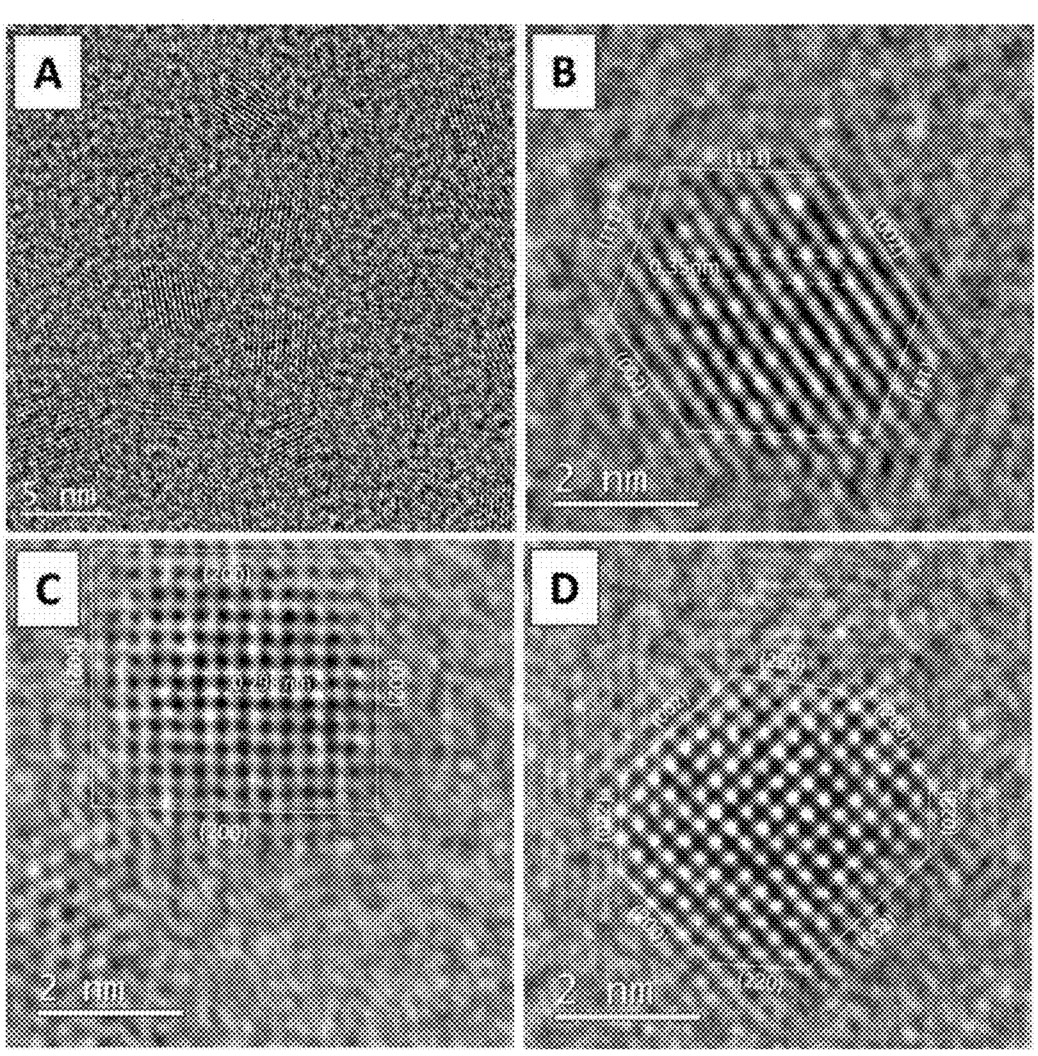

FIG. 12 shows a HRTEM image of PbS quantum dots made from lead (IV) oxide precursors. The quantum dots appear in truncated octahedral crystals (major) and in cuboctahedral crystals (minor). The (002), (111) and (022) facets are visible in truncated octahedral crystals while the cuboctahedral crystals appear with the (002) facet.

FIG. 13 is a scheme showing the preparation of PbS nanocrystals using Pb (IV) oxide as the lead source and surface passivation reaction.

DESCRIPTION

When describing the aspects of the invention, the terms used are to be construed in accordance with the following definitions, unless a context dictates otherwise.

As used in the specification and the appended claims, the singular forms "a", "an," and "the" include both singular and plural referents unless the context clearly dictates otherwise. By way of example, "a nanocrystal" means one nanocrystal or more than one nanocrystal. By way of example, "a lead (IV) containing compound" means one lead (IV) containing compound or more than one lead (IV) containing compound. References to a number when used in conjunction with comprising language include compositions comprising said number or more than said number.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

As used herein, the term "and/or," when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, B and C in combination; or A, B, and C in combination.

As used herein, unless otherwise expressly specified, all numbers such as those expressing values, ranges, amounts of percentages may be read as if prefaced by the word "about", even if the term does not expressly appear.

The term "about" as used herein when referring to a measurable value such as a parameter, an amount, a temporal duration, and the like, indicates that a value includes the standard deviation of error for the device or method being employed to determine the value. The term "about" is meant to encompass variations of +/−10% or less, +/−5% or less, or +/−0.1% or less of and from the specified value, insofar such variations are appropriate to perform in the disclosure. It is to be understood that the value to which the modifier "about" refers is itself also specifically disclosed.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Unless otherwise defined, all terms used in the disclosure, including technical and scientific terms, have the meaning as commonly understood by one of ordinary skill in the art to which this disclosure belongs. By means of further guidance, definitions for the terms used in the description are included to better appreciate the teaching of the present disclosure. All publications referenced herein are incorporated by reference thereto.

As used herein, unless otherwise defined, the term "composition" may be open ended or closed. For example, "composition" comprises the specified material, i.e., the nanocrystals, and further unspecified material, or may consist of the specified material, i.e., to the substantial exclusion of non-specified materials.

Suitable features of the invention are now set forth.

Use

According to a first aspect, the present invention provides the use of a lead (IV) containing compound to prepare a lead chalcogenide nanocrystal or a composition of lead chalcogenide nanocrystals.

As used herein, the term "lead (IV) containing compound" means any compound that includes lead in an oxidation state of +4. Any suitable such compound may be used. A suitable lead (IV) containing compound is preferably lead (IV) oxide (i.e. $PbO_2$).

Preferably any lead (II) containing compounds in the starting material are present in less than 50% by weight, preferably less than 25% by weight, preferably less than 10% by weight, preferably less than 10% by weight, preferably less than 1% by weight.

Suitably, the lead (IV) containing compound consists of or consists essentially of lead (IV) oxide.

The use of lead (IV) oxide is advantageous because it is a highly reactive and inexpensive material that can be readily used in large scale (such as commercial) processes, i.e. in an industrial scale production process. It is also surprising that the nanocrystals of the present invention can be made by the claimed method. It appears to work via a different mechanism to other reactions which use predominantly Pb (II) or mixed Pb(II, IV) reagents.

The size-dependent shapes, surface elemental composition and crystal facets of quantum dots (QDs) are of particular importance as they play an important role in determining their chemical reactivities, energy band levels and ligand coordination chemistry. They influence the colloidal quantum dots (CQDs) film formation which ultimately controls the electrical performance of CQDs optoelectronic devices. Size, shape and surface composition of QDs can be controlled via synthesis or post-synthesis surface modification. By selection of suitable synthesis conditions and precursors, the shapes and surfaces of colloidal quantum dots can be tailored as required for high quality film formation for optoelectronic devices. In the present invention, it is clear that the morphology of the nanoparticles from Pb(IV) is different from Pb(II) or mixed Pb(II,IV) reagents which we believe results from the use of the lead (IV) precursor/reaction mechanism. It is postulated that the cubic structure of the nanocrystals will have unprecedented optical/electrical properties.

As used herein, the term "chalcogenide" means a chemical compound that contains at least one chalcogen and at least one electropositive element. As used herein, the term "chalcogen" means a group 16 element. For example, a "chalcogenide" may comprise a chemical compound that contains oxide, sulphide, selenide, telluride or polonide and at least one electropositive element or cation. A "lead chalcogenide" is a chemical compound that contains oxide, sulphide, selenide, telluride or polonide and at least one lead cation.

As used herein, the term "nanocrystal" means a crystalline particle with at least one dimension measuring less than 100 nanometres (nm).

The lead chalcogenide nanocrystal may comprise a quantum dot (QD) or consist of quantum dots (QDs). As used herein, by the term "quantum dot" we mean a semiconductor nanocrystal exhibiting quantum confinement effects that allow it to mimic the properties of an atom. Quantum dots may also be known as zero-dimensional nanocrystals.

According to a second aspect, the present invention provides the use of lead (IV) oxide to prepare a lead chalcogenide nanocrystal.

Suitably, the lead chalcogenide nanocrystals or lead chalcogenide nanocrystal composition prepared from lead (IV) containing compounds exhibit absorption in the visible and near infra-red ranges, suitably in the range of 500 to 4500 nm, preferably suitably in the range of 500 to 2400 nm, preferably suitably in the range of 950 to 1600 nm, preferably in the range of 1350 to 1600 nm. In a preferred embodiment, lead chalcogenide nanocrystals or lead chalcogenide nanocrystal composition prepared from lead (IV) containing compounds exhibit absorption of greater than 1300 nm.

Suitably, lead sulphide nanocrystals or lead sulphide nanocrystal compositions prepared from lead (IV) containing compounds exhibit absorption in the visible and near infra-red ranges, suitably in the range of 500 to 2400 nm, preferably suitably in the range of 950 to 1600 nm, preferably in the range of 1350 to 1600 nm.

Suitably, lead selenide nanocrystals or lead selenide nanocrystal compositions prepared from lead (IV) containing compounds exhibit absorption in the visible and near infra-red ranges, suitably in the range of 800 to 4500 nm, preferably suitably in the range of 950 to 1600 nm, preferably in the range of 1350 to 1600 nm.

Suitably, lead telluride nanocrystals or lead telluride nanocrystal compositions prepared from lead (IV) containing compounds exhibit absorption in the visible and near infra-red ranges, suitably in the range of 500 to 2400 nm, preferably suitably in the range of 950 to 1600 nm, preferably in the range of 1350 to 1600 nm.

Suitably, the lead chalcogenide nanocrystals or lead chalcogenide nanocrystal composition prepared from lead (IV) containing compounds exhibit emission in the visible and near infra-red ranges, suitably in the range of 600 to 4500 nm, preferably suitably in the range of 600 to 2500 nm, preferably suitably in the range of 950 to 1600 nm, preferably in the range of 1350 to 1600 nm.

Preferably, lead sulphide nanocrystals or lead sulphide nanocrystal compositions prepared from lead (IV) containing compounds exhibit absorption a maximum absorption wavelength ($\lambda_{max}$) a of greater than 1300 nm, preferably in the range of 1350 to 2500 nm, preferably 1400 to 1750 nm, preferably 1450 to 1600 nm.

Suitably, lead sulphide nanocrystals or lead sulphide nanocrystal compositions prepared from lead (IV) containing compounds exhibit emission in the visible and near infra-red ranges, suitably in the range of 600 to 2500 nm, preferably suitably in the range of 950 to 1600 nm, preferably in the range of 1350 to 1600 nm.

Suitably, lead selenide nanocrystals or lead selenide nanocrystal compositions prepared from lead (IV) containing compounds exhibit emission in the visible and near infra-red ranges, suitably in the range of 900 to 4500 nm, preferably suitably in the range of 950 to 1600 nm, preferably in the range of 1350 to 1600 nm.

Suitably, lead telluride nanocrystals or lead telluride nanocrystal compositions prepared from lead (IV) containing compounds exhibit emission in the visible and near infra-red ranges, suitably in the range of 600 to 2500 nm, preferably suitably in the range of 950 to 1600 nm, preferably in the range of 1350 to 1600 nm.

Method

According to a third aspect, the present invention provides a method for preparing a lead chalcogenide nanocrystal or lead chalcogenide nanocrystal composition, the method comprising contacting a lead (IV) containing compound with an organic acid and a chalcogen-containing reagent, wherein the molar ratio of the lead (IV) compound to any lead (II) containing compound present is greater than 1:1, preferably greater than 2:1, preferably greater than 3:1, preferably greater than 5:1, preferably greater than 10:1, preferably greater than 20:1. Preferably no lead (II) oxide is present in the starting material. Preferably no lead (II) containing compounds are present in the starting material.

A fourth aspect of the present invention provides a method for preparing a lead chalcogenide nanocrystal or lead chalcogenide nanocrystal composition, the method comprising contacting lead (IV) oxide with an organic acid and a chalcogen-containing reagent, wherein the molar ratio of lead (IV) oxide to any lead (II) oxide present is greater than 1:1, preferably greater than 2:1, preferably greater than 3:1, preferably greater than 5:1, preferably greater than 10:1, preferably greater than 20:1. Preferably no lead (II) oxide is present in the starting material. Preferably no lead (II) containing compounds are present in the starting material.

The method suitably prepares a plurality of lead chalcogenide nanocrystals, i.e., a nanocrystal composition. The lead chalcogenide nanocrystals prepared by the method of the invention may comprise quantum dots (i.e. crystalline quantum dots).

Various aspects of the methods of the invention, such as the particular reagents and/or reaction conditions, may be varied so as to provide lead chalcogenide nanocrystals of a desired size so as to achieve desired optical properties, such as desired absorption and emission (for example for a particular use of the nanocrystals).

For example, the reagents used (particularly chalcogen-containing reagent) in the methods may be varied to provide lead chalcogenide nanocrystals of a desired size so as to achieve desired optical properties, such as desired absorption and emission (for example for a particular use of the nanocrystals).

For example, the reaction conditions of the methods may be varied to provide lead chalcogenide nanocrystals of a desired size so as to achieve desired optical properties, such as desired absorption and emission (for example for a particular use of the nanocrystals).

In other words, the uses and methods of the invention may be used to prepare lead chalcogenide nanocrystals having size-tuneable optical properties. Examples of the reagents and/or reaction conditions that may be varied are discussed herein.

The method of the invention may comprise the step of selecting a particular reagent so as to control the size of the nanocrystal(s) prepared, i.e. so as to prepare nanocrystal(s) having desired optical properties. For example, a reagent that may be selected in order to control the size of the nanocrystals prepared may be the particular chalcogen-containing reagent.

The method of the invention may comprise the step of modifying a reaction condition so as to control the size of the nanocrystal(s) prepared, i.e. so as to prepare nanocrystal(s) having desired optical properties. For example, reaction conditions that may be modified in order to control the size of the nanocrystals prepared include one or more of the following:

(i) solvent type;
(ii) amount of solvent;
(iii) organic acid type;
(iv) amount of organic acid;
(v) mode of addition of the reactants (particularly of chalcogen-containing reagent);
(vi) reaction temperature;
(vii) ratio of Pb to chalcogen-containing reagent; and
(viii) addition of a secondary solvent.

By modifying a reaction condition to control the size of the nanocrystal(s) prepared, the optical properties (absorption and emission) may be modified and finely tuned to the desired properties. This provides a method for finely tuning the size and optical properties (absorption and emission) of the nanocrystals.

Suitably, the method of the invention provides lead chalcogenide nanocrystals and compositions thereof exhibiting absorption in the visible and near infra-red ranges, for example in a range of from about 500 to 4500 nm, preferably suitably in the range of 500 to 2400 nm, preferably suitably in the range of 950 to 1600 nm, preferably in the range of 1350 to 1600 nm. The particular absorption exhibited may be selected by varying the particular reagents and/or reaction conditions used as discussed herein. Suitably, lead sulphide nanocrystals prepared from lead (IV) containing compounds exhibit absorption in the visible and near infra-red ranges, suitably in the range of 500 to 2400 nm, preferably suitably in the range of 950 to 1600 nm, preferably in the range of 1350 to 1600 nm. Suitably, lead selenide nanocrystals prepared from lead (IV) containing compounds exhibit absorption in the visible and near infra-red ranges, suitably in the range of 800 to 4500 nm, preferably suitably in the range of 950 to 1600 nm, preferably in the range of 1350 to 1600 nm. Suitably, lead telluride nanocrystals prepared from lead (IV) containing compounds exhibit absorption in the visible and near infra-red ranges, suitably in the range of 500 to 2400 nm, preferably suitably in the range of 950 to 1600 nm, preferably in the range of 1350 to 1600 nm.

Suitably, the method of the invention provides lead chalcogenide nanocrystals and compositions thereof exhibiting emission in the visible and near infra-red ranges, for example in a range of from about 600 to 4500 nm, preferably suitably in the range of 600 to 2500 nm, preferably suitably in the range of 950 to 1600 nm, preferably in the range of 1350 to 1600 nm. The particular emission exhibited may be selected by varying the particular reagents and/or reaction conditions used as discussed herein. Suitably, lead sulphide nanocrystals prepared from lead (IV) containing compounds exhibit emission in the visible and near infra-red ranges, suitably in the range of 600 to 2500 nm, preferably suitably in the range of 950 to 1600 nm, preferably in the range of 1350 to 1600 nm. Suitably, lead selenide nanocrystals prepared from lead (IV) containing compounds exhibit emission in the visible and near infra-red ranges, suitably in the range of 900 to 4500 nm, preferably suitably in the range of 950 to 1600 nm, preferably in the range of 1350 to 1600 nm. Suitably, lead telluride nanocrystals prepared from lead (IV) containing compounds exhibit emission in the visible and near infra-red ranges, suitably in the range of 600 to 2500 nm, preferably suitably in the range of 950 to 1600 nm, preferably in the range of 1350 to 1600 nm.

Suitably, as for the uses discussed above, any suitable lead (IV) containing compound may be used in the method of the invention. Suitably, the lead (IV) containing compound consists of or consists essentially of lead (IV) oxide.

As used herein, the term "organic acid" means an organic compound having acidic properties. As used herein, the term "organic compound" means a chemical compound in which one or more atoms of carbon are covalently linked to atoms of other elements, most commonly hydrogen, oxygen, and/or nitrogen.

Any suitable organic acid may be used in the method of the present invention. Suitably, the organic acid comprises a carboxylic acid, such as a fatty acid (for example a saturated or unsaturated fatty acid, suitably an unsaturated fatty acid). Examples of suitable carboxylic acids include C4 to C28, such as C12-C22, fatty acids. Suitably, the organic acid may comprise oleic acid.

Suitably, the organic acid comprises a fatty acid, preferably oleic acid.

As used herein, the term "chalcogen-containing reagent" means a reagent that comprises at least one chalcogen, i.e. at least one group 16 element or anion thereof. Any suitable chalcogen-containing reagent may be used in the method of the invention. For example, the chalcogen-containing reagent may be selected from an oxygen-, sulphur-, selenium- and tellurium-containing reagent (such as a sulphur-, selenium- and tellurium-containing reagent, particularly a sulphur- or selenium containing reagent), and mixtures thereof.

Suitably, the chalcogen-containing reagent may comprise a chalcogen-containing compound or an elemental chalcogen, and mixtures thereof. For example, the chalcogen-containing reagent may comprise a chalcogen-containing compound. For example, the chalcogen-containing reagent may comprise an elemental chalcogen.

A suitable chalcogen-containing compound may comprise an oxygen, sulphur, selenium or tellurium atom, or a combination thereof, and at least one suitable atom of another element. More suitably, the chalcogen-containing compound may comprise a sulphur, selenium or tellurium atom, or a combination thereof (preferably a sulphur or selenium atom), and at least one suitable atom of another element.

Suitably, the chalcogen-containing compound may comprise an ionic compound comprising an oxygen, sulphur, selenium or tellurium anion, or a combination thereof, and at least one suitable cation. More suitably, the chalcogen-containing ionic compound may comprise a sulphur, selenium or tellurium anion, or a combination thereof (preferably a sulphur or selenium anion), and at least one suitable cation.

Examples of suitable oxygen-containing reagents include oxygen gas.

Examples of suitable sulphur-containing reagents include bis(trialkylsilyl)sulphide compounds (such as bis(trimethylsilyl)sulphide, bis(triethylsilyl)sulphide and bis(tripropylsilyl)sulphide, particularly bis(trimethylsilyl)sulphide), thioacetamide, tri-n-octylphosphine sulphide, tributylphosphine sulphide, (alkyl substituted, phenyl) thiourea compounds (such as N,N'-disubstituted and N,N,N'-trisubstituted thioureas), alkyl substituted thioamide compounds and elemental sulphur.

Thioacetamide is an inexpensive reagent which has a low toxicity, making it particularly suitable for large scale use.

Examples of suitable selenium-containing compounds include bis(trimethylsilyl)selenide, tri-n-octylphosphine selenide (TOPSe) and tributylphosphine selenide.

It is also preferable to use certain phosphine containing reagents, as these can form higher reactive Se precursors than TOPSe. These precursors play an important role in maintaining a high PbSe oversaturation which is important in promoting nucleation, growth and to control size distribution of QDs as well as allows mild reaction conditions. Examples of preferred phosphine containing reagents include diphenylphosphine selenide (DPP), di-ortho-tolylphosphine selenide (DOTP) and diphenylphosphineoxide selenide (DPPO).

Examples of suitable tellurium-containing compounds include tri n-octylphosphine telluride.

In all of the following examples, methods, uses and aspects of the invention, the lead (IV) compound or lead (IV) oxide preferably constitutes at least 50 molar % of all the lead present in the lead compound starting material, preferably greater than 75 molar %, preferably greater than 90 molar %, preferably greater than 95 molar %.

For example, the method of the present invention may comprise contacting lead (IV) oxide starting material with a fatty acid and a chalcogen-containing reagent. Preferably no lead (II) containing compounds are present in the starting material.

For example, the method of the present invention may comprise contacting lead (IV) oxide starting material with oleic acid and a chalcogen-containing reagent. Preferably no lead (II) containing compounds are present in the starting material.

For example, the method of the present invention may comprise contacting lead (IV) oxide starting material with a fatty acid and a chalcogen-containing compound. Preferably no lead (II) containing compounds are present in the starting material.

For example, the method of the present invention may comprise contacting lead (IV) oxide starting material with oleic acid and a chalcogen-containing compound. Preferably no lead (II) containing compounds are present in the starting material.

For example, the method of the present invention may comprise contacting lead (IV) oxide starting material with a fatty acid and an oxygen, sulphur, selenium or tellurium-containing (such as a sulphur, selenium or tellurium-containing, particularly a sulphur-containing or a selenium-containing) reagent. Preferably no lead (II) containing compounds are present in the starting material.

For example, the method of the present invention may comprise contacting lead (IV) oxide starting material with oleic acid and an oxygen, sulphur, selenium or tellurium-containing (such as a sulphur, selenium or tellurium-containing, particularly a sulphur-containing or a selenium-containing) reagent. Preferably no lead (II) containing compounds are present in the starting material.

For example, the method of the present invention may comprise contacting lead (IV) oxide starting material with a fatty acid and an oxygen, sulphur, selenium or tellurium-containing (such as a sulphur, selenium or tellurium-containing, particularly a sulphur-containing or a selenium-containing) compound. Preferably no lead (II) containing compounds are present in the starting material.

For example, the method of the present invention may comprise contacting lead (IV) oxide starting material with oleic acid and an oxygen, sulphur, selenium or tellurium-containing (such as a sulphur, selenium or tellurium-containing, particularly a sulphur-containing or a selenium-containing) compound. Preferably no lead (II) containing compounds are present in the starting material.

The references to contacting the lead (IV) containing compound starting material with an organic acid and a chalcogen-containing reagent refer to bringing these reagents together in such a way as to enable them to react, i.e. to prepare lead chalcogenide nanocrystals and/or compositions thereof. Preferably no lead (II) containing compounds are present in the starting material.

Suitably, the lead (IV) containing compound starting material is contacted with the organic acid to produce a lead salt and the lead salt is contacted with the chalcogen-containing reagent. In other words, the lead (IV) containing compound is contacted with and reacts with the organic acid to form a lead salt. The lead salt so formed then reacts with the chalcogen-containing reagent to form the lead chalcogenide nanocrystal(s) and/or compositions thereof. The lead salt may be isolated before reaction with the chalcogen-containing reagent, although typically it is unnecessary to do so. Conducting the method without isolating the lead salt offers the advantage of conducting the method as a one-pot synthesis, which enables easy scale up of the method.

The formation of a lead salt as discussed above may be monitored in any suitable way, for example visually by means of a colour change as the lead salt is formed.

The lead (IV) containing compound, organic acid and chalcogen-containing reagent may be contacted (or reacted) in any suitable manner, typically by mixing in a suitable reaction vessel.

Typically, the lead (IV) containing compound is believed to react with the organic acid to form a lead salt, which lead salt then reacts with the chalcogen-containing reagent to form the lead chalcogenide nanocrystal(s) and/or compositions thereof.

Typically, the lead (IV) containing compound may be contacted with a molar excess of the organic acid. For example, the molar ratio of the lead atoms (in the lead (IV) containing compound) to the organic acid may be in the range of from 1:1.5 to 1:200, such as from 1:1.5 to 1:60. It is believed that the molar ratio of the lead atoms (in the lead (IV) containing compound) to organic acid may be selected so as to achieve a desired nanocrystal size, and so a desired absorption. Typically, the higher the amount of organic acid that is used then the larger the nanocrystals are formed.

Typically, the lead salt may be contacted with the chalcogen-containing reagent in an amount such that there is a molar excess of lead atoms to chalcogen atoms. For example, the molar ratio of lead atoms to chalcogen atoms may be in the range of from 0.9:1 to 50:1; such as from 1.5:1 to 30:1, such as from 1.5:1 to 25:1. It is believed that the molar ratio of the lead atoms (in the lead salt) to chalcogen atoms (in the chalcogen-containing reagent) may be selected so as to achieve a highly monodispersed nanocrystals over a wide range of sizes, and consequently a desired narrow absorption peak over a wider range. Typically, the higher the amount of lead atoms used then the highly monodispersed nanocrystals over a wider absorption range are formed.

Typically, the lead (IV) containing compound and the organic acid are mixed in a suitable solvent until the reaction (i.e. the formation of a lead salt) is substantially complete and a solution of the lead salt in the solvent is produced. The chalcogen-containing reagent may then be added to the solution of the lead salt and allowed to react to form the lead chalcogenide nanocrystals and/or compositions thereof. The chalcogen-containing reagent may be added with or without solvent.

The lead salt and chalcogen-containing reagent may be contacted in any suitable way. Suitably, the lead salt and the chalcogen-containing reagent may be mixed together, for example in the presence of a suitable solvent. A solution of the chalcogen-containing reagent in a suitable solvent may, for example, be added to a solution of the lead salt in a suitable solvent (preferably the same solvent). Alternatively, the chalcogen-containing reagent may, for example, be added directly to a solution of the lead salt in a suitable solvent. The addition of the chalcogen-containing reagent may be conducted in one step or in multiple steps. For example, the chalcogen-containing reagent may be added to the lead salt in two or more portions, for example in two portions. It is believed that the mode of addition of the chalcogen-containing reagent may be used to change the size of the nanocrystals produced and therefore to finely tune the optical properties of the nanocrystals. Typically, adding the chalcogen-containing reagent in multiple steps provides larger nanocrystals (i.e. compared to a single step addition).

The method of the present invention may further comprise adding a second solvent immediately after the addition of the chalcogen-containing reagent to the lead salt (i.e. so as to rapidly quench the reaction). The second solvent is typically an organic solvent, such as polar solvent (for example acetone, methanol or ethanol) or a non-polar solvent (such as hexane).

The method of the present invention may be conducted at any suitable temperature. For example, the lead (IV) containing compound may be contacted with the organic acid at any suitable temperature, i.e. at any suitable temperature at which a reaction occurs. The particular temperature at which this reaction occurs may depend on the particular lead (IV) containing compound and organic acid being reacted. A suitable temperature may be in the range of from 120 to 250° C., for example from 120 to 240° C., for example from 180 to 240° C., for example from 180 to 230° C.

The lead salt may be contacted with the chalcogen-containing reagent at any suitable temperature, i.e. at any suitable temperature at which a reaction occurs. The particular temperature at which this reaction occurs may depend, inter alia, on the particular lead salt and chalcogen-containing reagent being reacted. A suitable temperature may be in the range of from 20 to 300° C. or 20 to 180° C. It is believed that the selection of a particular reaction temperature can be used to change the size of the nanocrystals formed, so as to finely tune their optical properties as desired. Typically, increasing the temperature at which the lead salt and the chalcogen-containing reagent are contacted/reacted provides larger nanocrystals.

The temperature at which the lead (IV) containing compound is contacted with the organic acid may be the same or different to the temperature at which the lead salt is contacted with the chalcogenide-containing reagent. Suitably, the temperature at which the lead (IV) containing compound is contacted with the organic acid may be higher than the temperature at which the resultant lead salt is contacted with the chalcogenide-containing reagent. For example, a temperature of 150-300° C. may be used for the resultant lead salt to contact with the chalcogenide-containing reagent to improve quality of quantum dots.

Suitably, the lead salt may be contacted with the chalcogen-containing reagent at a temperature of from 20 to 150° C., such as from 30 to 100° C., such as from 30 to 60° C., such as from 20 to 60° C., for example, about 40° C. Such a reaction temperature may be suitable when the chalcogen-containing reagent is bis(trimethylsilyl)sulphide, for example when the bis(trimethylsilyl)sulphide is contacted with lead oleate. Such low temperature conditions offer advantages in use, especially in relation to large scale production.

For example, when the lead salt comprises lead oleate and the chalcogen-containing reagent comprises bis(trimethylsilyl)sulphide, the temperature at which these are reacted may be in the range of from 20 to 180° C., such as from 20 to 55° C., preferably about 40° C. This method, in which the chalcogen-containing reagent comprises bis(trimethylsilyl)sulphide, may provide lead chalcogenide nanocrystals that exhibit absorption in the visible and near infra-red ranges, for example in a range of from about 500 to 4500 nm, such as from about 500 to 2400 nm, such as from about 530 to 2400 nm, such as from about 530 to 1450 nm. This method, in which the chalcogen-containing reagent comprises bis(trimethylsilyl)sulphide, may provide lead chalcogenide nanocrystals that exhibit emission in the visible and near infra-red ranges, for example in a range of from about 600 to 4500 nm, such as from about 600 to 2500 nm, such as from about 630 to 2500 nm, such as from about 630 to 1550 nm.

Suitably, the lead salt may be contacted with the chalcogen-containing reagent at a temperature of from 50 to 300° C., such as from 50 to 150° C. Such a reaction temperature may be suitable when the chalcogen-containing reagent comprises thioacetamide, for example when the thioacetamide is contacted with lead oleate. This method, in which the chalcogen-containing reagent comprises thioacetamide, may provide lead chalcogenide nanocrystals that exhibit absorption in the visible and near infra-red ranges, for example in a range of from about 500 to 2400 nm, such as 500 to 1700 nm. This method, in which the chalcogen-containing reagent comprises thioacetamide, may provide lead chalcogenide nanocrystals that exhibit emission in the visible and near infra-red ranges, for example in a range of from about 600 to 2500 nm, such as 600 to 1800 nm.

The method of the present invention may be conducted in the presence of a solvent. Any suitable solvent may be used. Suitably, the solvent is a solvent that will not form a coordination complex with the lead. Suitably, the solvent is an organic solvent, such as a non-polar solvent or polar solvent, or a mixture thereof. Examples of suitable solvents include C4-C28 organic solvents, such as octadecene or polar solvents such as dimethylformamide, N-methyl-2-pyrrolidone, dimethylacetamide, tetrahydrofuran. Typically, the same solvent is used for the reaction of the lead (IV) containing compound with the organic acid, and for the reaction of the resultant lead salt with the chalcogen-containing reagent. This simplifies the method, making it particularly suitable for large scale use.

For example, the lead (IV) containing compound may be contacted with the organic acid in the presence of a suitable solvent. Suitably, the solvent is a non-polar solvent or a polar solvent or the mixture thereof. Examples of suitable solvents include C4-C22 organic solvents, such as octadecene.

For example, the resultant lead salt may be contacted with the chalcogen-containing reagent in the presence of a suitable solvent. Suitably, the solvent is a non-polar solvent or a polar solvent or the mixture thereof. Examples of suitable solvents include C4-C22 organic solvents, such as octadecene.

The amount of solvent used may be selected according to the particular reagents used and/or other reaction conditions applied. Typically, the concentration of the lead (IV) containing compound in the solvent (at the start of the reaction) may be in the range of 0.005 to 0.10 mmol/ml. Typically, the concentration of lead atoms in the solvent (at the start of the reaction) may be in the range of 0.015 to 0.30 mmol/ml. Typically, the concentration of the organic acid in the solvent (at the start of the reaction) may be in the range of 0.0075 to 10 mmol/ml, such as 0.1 to 2 mmol/ml. It is believed that the amount of solvent may affect the size of the eventual lead-chalcogenide nanocrystals formed and so the selection of the amount of solvent to be used in the method may assist in the fine tuning of their optical properties. For example, it is believed that decreasing the amount of solvent may typically result in larger nanocrystals being produced.

Suitably, the method of the present invention is conducted in an inert atmosphere. Any suitable inert atmosphere may be used, such as nitrogen or argon.

Suitably, the lead (IV) containing compound may be contacted with the organic acid for a period of time necessary to establish the preparation of the lead salt. The suitable reaction time will depend on the particular reagents and reaction conditions being used. A typical reaction time may, for example, be in the range of 5 minutes to 2 hours, such as 7 minutes to 2 hours.

Suitably, the lead salt may be contacted with the chalcogen-containing reagent for a period of time necessary to establish the preparation of the lead chalcogenide nanocrystals. The suitable reaction time will depend on the particular reagents and reaction conditions being used. A typical reaction time may, for example, be in the range of 5 minutes to 2 hours, such as 30 minutes to 2 hours.

The method of the invention may comprise:

forming a first solution of the lead (IV) containing compound and organic acid in a first solvent;
forming a second solution of the chalcogen-containing reagent (for example bis(trimethylsilyl)sulphide) in a second solvent;
heating the first solution to a first temperature in the range of from 120 to 250° C. and maintaining the first solution at the first temperature for a predetermined length of time;
reducing the temperature of the first solution to a reduced temperature in the range of from 20 to 100° C.;
adding the second solution to the first solution at the reduced temperature to produce a reaction mixture;
maintaining the reaction mixture at a temperature of from 20 to 300° C. for a predetermined length of time.

The method of the invention may comprise:

forming a first solution of the lead (IV) containing compound and organic acid in a first solvent;
forming a second solution of the chalcogen-containing reagent (for example bis(trimethylsilyl)sulphide) in a second solvent;
heating the first solution to a first temperature in the range of from 120 to 250° C. and maintaining the first solution at the first temperature for a predetermined length of time;
reducing the temperature of the first solution to a reduced temperature in the range of from 20 to 60° C.;
adding the second solution to the first solution at the reduced temperature to produce a reaction mixture;
maintaining the reaction mixture at a temperature of from 20 to 60° C. for a predetermined length of time.

The method of the invention may comprise:

forming a first solution of the lead (IV) containing compound and organic acid in a first solvent;
heating the first solution to a first temperature in the range of from 120 to 250° C. and maintaining the first solution at the first temperature for a predetermined length of time;
providing the first solution at a second temperature in the range of from 50 to 100° C.;
adding the chalcogen-containing reagent (for example thioacetamide) to the first solution at the second temperature to produce a reaction mixture;
maintaining the reaction mixture at a temperature of from 50 to 300° C. for a predetermined length of time.

The method of the invention may comprise:

forming a first solution of the lead (IV) containing compound and organic acid in a first solvent;
heating the first solution to a first temperature in the range of from 120 to 250° C. and maintaining the first solution at the first temperature for a predetermined length of time;
providing the first solution at a second temperature in the range of from 50 to 150° C.;
adding the chalcogen-containing reagent (for example thioacetamide) to the first solution at the second temperature to produce a reaction mixture;
maintaining the reaction mixture at a temperature of from 50 to 150° C. for a predetermined length of time.

The method of the present invention may further comprise monitoring an optical property (i.e. of the reaction mixture, such as a solution of the reactants) so as to monitor the progress of the production of the nanocrystals. The optical property may be a UV-visible-near infrared absorbance spectrum. The method may comprise the step of stopping the reaction when a value of the optical property corresponds to the desired size and/or size distribution of the lead chalcogenide nanocrystals.

The method of the invention may further comprise isolating the lead-chalcogenide nanocrystals from the reaction mixture. Any suitable method of isolating the lead-chalcogenide nanocrystals may be used.

The method of the invention may comprise quenching the reaction mixture, for example by adding a quenching solvent to the reaction mixture. Any suitable quenching solvent may be used, such as acetone, methanol, ethanol or hexane. The method of the invention may further comprise isolating the lead chalcogenide nanoparticles.

For example, the lead-chalcogenide nanocrystals may be precipitated from the reaction mixture using a suitable solvent, such as a polar solvent (for example acetone, methanol or ethanol). The isolation step may be conducted in an inert atmosphere or in air.

When the chalcogen-containing reagent comprises bis (trimethylsilyl)sulphide, it is believed that the amount of organic acid (for example oleic acid) greatly influences the size of the nanocrystals prepared. Typically, the more organic acid introduced, the larger the size of nanocrystals were made.

When the chalcogen-containing reagent comprises bis (trimethylsilyl)sulphide, it is believed that multi-step additions of the lead (IV) containing compound and/or of the bis(trimethylsilyl)sulphide typically produces larger nanocrystals.

When the chalcogen-containing reagent comprises bis(trimethylsilyl)sulphide, it is believed that increasing the temperature at which the bis(trimethylsilyl)sulphide is reacted with the lead salt from 40° C. to 60° C., typically provides larger nanocrystals.

When the chalcogen-containing reagent comprises bis(trimethylsilyl)sulphide, it is believed that introducing acetone, alcohols or water could result in ultra-small sizes of nanocrystals.

When the chalcogen-containing reagent comprises bis(trimethylsilyl)sulphide, it is believed that introducing cold hexane quickly after injection of the bis(trimethylsilyl)sulphide results in small nanocrystals being formed.

When the chalcogen-containing reagent comprises bis(trimethylsilyl)sulphide, it is believed that reducing the concentration of lead oleate by increasing the amount of solvent (for example octadecene) results in the formation of smaller nanocrystals.

When the chalcogen-containing reagent comprises bis(trimethylsilyl)sulphide, it is believed that any combinations of the above method steps may be used to produce a broad range of nanocrystals at a temperature (i.e. for the reaction of the bis(trimethylsilyl)sulphide with the lead salt) of from 20 to 60° C.

When the chalcogen-containing reagent comprises thioacetamide, the method may be simplified as it is acceptable to simply load the thioacetamide into the reaction (i.e. without first dissolving the thioacetamide into a solvent) or load the solution of thioacetamide in a solvent or a mixture of solvents.

When the chalcogen-containing reagent comprises thioacetamide, it is believed that the amount of organic acid (such as oleic acid) greatly influences the size of the nanocrystals prepared, such that the more organic acid used then the larger the size of the nanocrystals prepared.

When the chalcogen-containing reagent comprises thioacetamide, it is believed that increasing the temperature of the reaction of the thioacetamide with the lead salt (for example to a temperature of about 85° C.) greatly influences the size of the nanocrystals prepared, such that the higher the temperature used then the larger the size of the nanocrystals prepared.

When the chalcogen-containing reagent comprises thioacetamide, it is believed that reducing the concentration of the lead salt (such as lead oleate) in the solvent, i.e. by increasing the amount of solvent, may provide smaller nanocrystals.

When the chalcogen-containing reagent comprises thioacetamide, it is believed that introducing acetone, alcohols or water could result in ultra-small sizes of nanocrystals.

When the chalcogen-containing reagent comprises thioacetamide, it is believed that introducing cold hexane quickly after injection of thioacetamide results in small nanocrystals being formed.

When the chalcogen-containing reagent comprises thioacetamide, it is believed that any combinations of the above method steps may be used to produce a broad range of nanocrystals at a temperature (i.e. for the reaction of the thioacetamide with the lead salt) of from 50 to 300° C., suitably 50 to 150° C.

The method of the present invention produces lead-chalcogenide nanocrystals. Suitably, the nanocrystals may comprise quantum dots (i.e. crystalline quantum dots).

In parallel, low-cost and less toxic TAA was used to replace expensive, toxic and extremely malodour $(TMS)_2S$ precursor for making PbS nanocrystals. It was found that the threshold temperature for TAA reaction was at about 50° C. and the higher temperature applied, the larger PbS nanocrystals were made. Also, the amount of oleic acid could affect the size of PbS and it was found that the larger amount of OA applied, the larger PbS nanocrystals was achieved.

Therefore, the present invention enables PbS QDs which operate in the visible range using TAA reagents.

Nanocrystals/Quantum Dots

The present invention provides one or more (preferably a plurality of, i.e., a composition) of lead chalcogenide nanocrystals obtained by the method set out above.

Suitably, the lead chalcogenide nanocrystals exhibit absorption in the visible and near infra-red ranges, for example in a range of from about 500 to 4500 nm, such as from about 500 to 2400 nm, such as from about 530 to 2400 nm, such as from about 530 to 1450 nm, preferably suitably in the range of 950 to 1600 nm, preferably in the range of 1350 to 1600 nm.

Suitably, the lead chalcogenide nanocrystals exhibit emission in the visible and near infra-red ranges, for example in a range of from about 600 to 4500 nm, such as from about 600 to 2500 nm, such as from about 630 to 2500 nm, such as from about 630 to 1550 nm, preferably suitably in the range of 950 to 1600 nm, preferably in the range of 1350 to 1600 nm.

The lead chalcogenide nanocrystal composition according to the invention comprises or consists of nanocrystals having a mean particle size of greater than 5 nm, preferably in the range of 6 to 22 nm, preferably 7 to 20 nm, and a relative size dispersion of less than 25%, preferably less than 20%, preferably less than 10%. Preferably, said nanocrystals have a mean particle size in the range of 8 to 17 nm, and a relative size dispersion of less than 20%. Preferably, said nanocrystals have a mean particle size in the range of 9 to 15 nm, and a relative size dispersion of less than 15%.

Preferably, the PbS nanocrystal composition according to the invention comprises or consists of nanocrystals having a mean particle size in the range of 6 to 15 nm, and a relative size dispersion of less than 20%, preferably less than 10%.

The PbSe nanocrystal composition according to the invention comprises or consists of nanocrystals having a mean particle size in the range of 2 to 17 nm, preferably 6 to 15 nm and a relative size dispersion of less than 25%, preferably less than 20%.

The lead chalcogenide nanocrystal compositions according to the eighth aspect of the invention preferably contain lead chalcogenide nanocrystals having a mean particle size in the range of 6 to 20 nm, preferably 7 to 17 nm, preferably 8 to 15 nm.

The lead chalcogenide nanocrystal compositions according to the eighth aspect of the invention preferably contain greater than 0.001% by weight of lead chalcogenide nanocrystals, preferably greater than 0.01% by weight, preferably greater than 0.1% by weight, preferably greater than 1% by weight, preferably greater than 5% by weight.

In some applications, lead chalcogenide nanocrystal compositions according to the eighth aspect of the invention preferably contain greater than 5% by weight of lead chalcogenide nanocrystals, preferably greater than 30% by weight, preferably greater than 75% by weight, preferably greater than 90% by weight, preferably greater than 95% by weight.

In one embodiment, the lead chalcogenide nanocrystal compositions according to the eighth aspect of the invention consists of lead chalcogenide nanocrystals.

The remainder of the composition, which is not lead chalcogenide nanocrystals, may be a carrier material, such as a solvent, additives, inorganic ligands, organic ligands or a reaction by-product.

The present invention also provides a composition of lead chalcogenide nanocrystals directly obtained by the method set out above.

The present invention also provides a composition of lead chalcogenide nanocrystals obtainable by the method set out above.

The composition of lead chalcogenide nanocrystals may comprise one or more quantum dots (i.e. crystalline quantum dots). The present invention provides a composition of lead chalcogenide quantum dots obtained by the method set out above.

The present invention also provides a composition of lead chalcogenide quantum dots directly obtained by the method set out above.

The present invention also provides a composition of lead chalcogenide quantum dots obtainable by the method set out above.

The lead chalcogenide nanocrystals (for example lead chalcogenide quantum dots) and compositions, films, systems or components containing said lead chalcogenide nanocrystals, may be used for any suitable purpose. For example, lead chalcogenide nanocrystals and compositions thereon may be used to provide for, or be used in photodetector, sensor, solar cell, bio-imaging or bio-sensing composition, photovoltaic system, display, battery, laser, photocatalyst, spectrometer, injectable composition, field-effect transistor, light-emitting diode, photonic or optical switching device or metamaterial, thermoelectric (cooling) and energy (high temperature power) generation applications, fiber amplifier, laser, optical gain media, optical fiber communication, highspeed communications, telecommunication, infrared LEDs and lasers, electroluminescent device.

The lead chalcogenide nanocrystal compositions (for example lead chalcogenide quantum dots) may also be used for IR sensing and photodetectors. For example, the lead chalcogenide nanocrystals (for example lead chalcogenide quantum dots) may be used as light absorbers in 3D camera sensors and 3D Time of flight camera sensors in mobile and consumer, automotive, medical, industrial, Defence and aerospace applications.

The lead chalcogenide nanocrystal compositions (for example lead chalcogenide quantum dots) may also be used in bio-imaging and bio-sensing applications. For example, the lead chalcogenide nanocrystals (for example lead chalcogenide quantum dots) may be used as bio-labels or bio-tags in in vitro and ex vivo applications.

The lead chalcogenide nanocrystal compositions (for example lead chalcogenide quantum dots) may also be used in wired, high speed communication devices, night vision devices and solar energy conversion.

The present invention provides a film comprising the lead chalcogenide nanocrystal compositions of the present invention.

The present invention provides a system or component, such as a photodetector, sensor, solar cell, bio-imaging or bio-sensing composition, photovoltaic system, display, battery, laser, photocatalyst, spectrometer, injectable composition, field-effect transistor, light-emitting diode, photonic or optical switching device or metamaterial, thermoelectric (cooling) and energy (high temperature power) generation applications comprising the lead chalcogenide nanocrystal compositions of the present invention.

The present invention provides a bio-label or bio-tag, biological imaging and labelling (in vitro and in vivo), comprising the lead chalcogenide nanocrystals of the present invention.

The processes of the present invention lead to excellent full width at half maximum (FWHM) values for the nanocrystals of the present invention. FWHM refers to the width of an optical signal at half its maximum intensity. This measure gives the bandwidth of a light source operating at 50% capacity.

The emissive properties of the nanocrystals of the present invention are both chemistry and size dependent. They usually exhibit an emissive function in the shape of a Gaussian curve. Lower intensities may result in broader spectral bandwidths and less pure colour representation onscreen. To determine the FWHM, the difference must be calculated between the low and high wavelength points at half the maximum spectral intensity. The narrower FWHM of the invention offer higher signal to noise ratio and allow the tuning of absorption wavelength more precisely. Essentially, narrower bandwidths translate to purer colours with higher levels of efficiency.

For example, the processes of the present invention can produce nanocrystals having a maximum absorption wavelength ($\lambda_{max}$) of greater than 1300 nm, preferably in the range of 1350 to 2500 nm, preferably 1400 to 1750 nm, preferably 1450 to 1600 nm and emission wavelength or photoluminescence (PL) in the range of 1200 to 2500 nm, preferably 1300 to 2000 nm, preferably 1350 to 1750 nm The compositions according to the eighth aspect of the invention can be produced having an absorption FWHM of less than 120 nm, preferably less than 110 nm, for example about 100 nm and an emission FWHM of less than 120 nm, preferably less than 110 nm, for example about 110 nm. These properties can be provided by nanocrystal compositions having relative size dispersions less than 20%, preferably less than 15%, preferably less than 10%.

The nanocrystals of the compositions according to the eighth aspect of the invention have a good relative size dispersion as a consequence of the processes used in the present invention. The relative size dispersion is a measure of the variance of the nanocrystal particle size. It is determined by measuring the particle sizes of a particular batch of nanoparticles, and determining the variance to the mean size. This can be expressed as a particular average size, x, plus or minus the range of particle size.

In general, the processes of the present invention enable the production of nanoparticle compositions according to the eighth aspect of the invention having a relative size dispersion (determined by TEM) of less than 25%, preferably less than 22%, preferably less than 20%, preferably less than 15%.

In a preferred embodiment of the invention, the nanocrystal compositions according to the eighth aspect of the invention have a molar ratio of lead atoms to chalcogen atoms in the range of from 1.2:1 to 4:1, preferably 1.6:1 to 3:1. This preferred range can be achieved for each of the PbS, PbSe and PbTe nanocrystals.

These ratios of lead atoms to chalcogen atoms are correlated to the low relative size distributions exhibited by the nanocrystals of the invention. Generally, the nanocrystal compositions according to the eighth aspect of the invention, having a molar ratio of lead atoms to chalcogen atoms in the range of from 1.2:1 to 4:1, have a relative size dispersion of less than 20%, for example, less than 18%, such as between 10 and 17%.

Generally, higher Pb to S ratio in lead sulphur nanocrystal composition correlates to large nanocrystal size and longer $\lambda_{max}$ of PbS dots. Generally, lower Pb to Se ratios (or increase in Se molar ratio) in lead selenium nanocrystal composition correlates to larger nanocrystal size and longer $\lambda_{max}$.

The molar ratio of lead atoms to chalcogen atoms is measured by inductively coupled plasma optical emission spectrometry (ICP-OES).

Generally, the PbS nanocrystal compositions according to the eighth aspect of the invention exhibit a proportional correlation between maximum absorption wavelength ($\lambda_{max}$) and their average particle size, i.e., larger dots exhibit longer $\lambda_{max}$. A similar trend in the nanoparticle size vs $\lambda_{max}$ correlation is seen for the PbSe nanocrystals. However, PbSe nanocrystals are generally smaller than PbS at the same $\lambda_{max}$. TEM images of PbS ($\lambda_{max}$=1314 nm) and PbSe ($\lambda_{max}$=2046 nm).

The preferred features of the fourth to seventh aspects are as defined in relation to the first, second and third aspects.

EXAMPLES

Several examples and comparative examples are described hereunder illustrating the methods according to the present disclosure.

Whereas particular examples of this invention have been described below for purposes of illustration, it will be evident to those skilled in the art that numerous variations of the details of the present invention may be made without departing from the invention as defined in the appended claims.

Unless other indicated, all parts and all percentages in the following examples, as well as throughout the specification, are parts by weight or percentages by weight respectively.

Absorption spectra of colloidal quantum dots or quantum dots films were obtained on a JASCO V-770 UV-visible/NIR spectrometer which can provide measurements in the 400 to 3200 nm wavelength.

XRD data were collected on a Panalytical X'Pert PRO MPD diffractometer using Cu $K_{a1}$ X-radiation (I=1.5406 Å) at room temperature over a range of 10<2q<90°. In each case a few drops of the dispersed sample were placed on a glass microscope slide and allowed to evaporate. Data were analysed using Rigaku SmartLab Studio II software and the search and match carried out using the Crystallographic Open Database.

TEM images and high-resolution transmission electron microscope (HRTEM) images were obtained with an FEI Talos F200X microscope equipped with an X-FEG electron source. The experiment was performed using an acceleration voltage of 200 kV and a beam current of approximately 5 nA. Images were recorded with an FEI CETA 4k×4k CMOS camera. In each case a few drops of the dispersed quantum dots in solvent were placed on a carbon coated copper grid and allow to evaporate. Samples were used as such or treated with acetone then methanol to clean unwanted organic materials before imaging.

ICP-OES data were obtained on an Agilent 720 ICP-OES. Each dispersion of the nanocrystals in toluene was added to water and heated to evaporate off the solvent then the solid was digested and remained in aqua regia (2HCl:1$HNO_3$). This was then made up to volume in a volumetric flask, and then diluted as necessary to run within the calibration range on our ICP. The samples were run on separate calibrations for Pb and S calibration standard. The certified calibration CRM solution that contained Pb is a 28 element multi standard from SPEX CertiPrep sourced from Fisher Scientific, and the certified calibration CRM solution that contained S is a multi-element standard labelled CCS-5 supplied by Inorganic Ventures. Both the Pb & S calibrations were run using 0.5 and 10 ppm concentrations.

Materials

PbO (99.999% trace metal basis, Sigma-Aldrich), $Pb_3O_4$ (99%, Sigma-Aldrich), $PbO_2$ (99.998% trace metal basis, Sigma-Aldrich), Hexamethyldisilathiane ($(TMS)_2S$, synthesis grade, Sigma-Aldrich) Oleic acid (OA, 90%, Fisher Scientific), Thioacetamide (TAA, ≥99%, Sigma-Aldrich), Trioctylphosphine (TOP, 97%, Sigma-Aldrich), Se, Octadecene (ODE, 90%, Fisher Scientific), Diphenyl Phosphine (DPP, 98%, Sigma-Aldrich). NaCl (99.5%, Fisher Scientific), NaI (≥99%, Sigma-Aldrich), $NH_4Cl$ (99.99% trace metal basis, Sigma-Aldrich). All solvent (Hexane, Acetone, Methanol) were purchased from Fisher Scientific.

Example 1: Synthesis of Lead Sulfide (PbS) Nanocrystals Using Pb(IV) Oxide ($PbO_2$) and Multiple Addition of $(TMS)_2S$ 1.25 g (5.23 mmol Pb) $PbO_2$ and 10 mL oleic acid (28.40 mmol) were added to a 50 mL three neck-round bottom flask. The mixture was degassed under vacuum then held under a nitrogen atmosphere for 60 min at 250° C. to produce lead (IV) oleate solution. After the clear brown oleate solution formed, the temperature was reduced to about 40° C. and 1.08 g (0.56 mmol Pb) of the lead(IV) oleate solution was used to add to a 100 mL three neck round bottom flask containing 13.50 mL previously degassed octadecene (ODE). The mixture was further degassed under vacuum at 90° C. for 30 min and kept under nitrogen at 100° C. 0.8 mL of the $1^{st}$ $(TMS)_2S$ stock solution in degassed ODE ($(TMS)_2S$ to ODE equal to 1/8 v/v) was injected. After 7 min reaction at 100° C., 0.8 mL of the 2 nd $(TMS)_2S$ stock solution in degassed ODE ($(TMS)_2S$ to ODE equal to 1/12 v/v) was added and the reaction mixture changed from light to dark brown within next few minutes indicating nanocrystals formation and growth. 0.8 mL of the $2^{nd}$ $(TMS)_2S$ stock solution was then added every 5 min until target absorption wavelength was obtained. The reaction was then cooled down to room temperature (20° C.-30° C.) and the PbS nanocrystals were purified through precipitation and re-dispersion in in access (four times volume) acetone and hexane respectively. The nanocrystals were then re-dispersed in required solvents such as n-hexane, n-octane or toluene.

Figure 1:
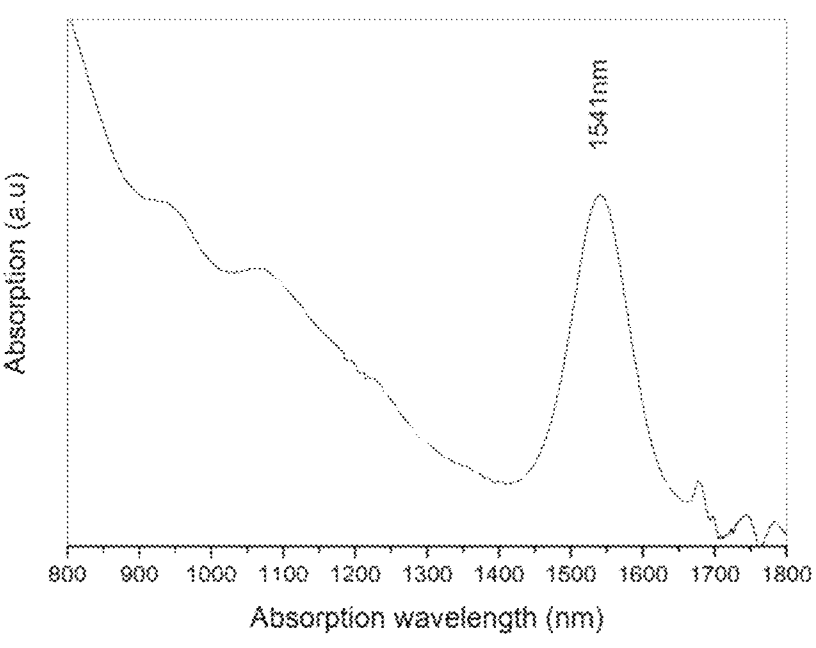
FIG. 1 shows absorption spectra of PbS nanocrystals using $PbO_2$ as lead source and $(TMS)_2S$ multiple additions.

FIG. 1 shows absorption spectrum of PbS nanocrystals using $PbO_2$ as lead source and $(TMS)_2S$ multiple additions. Table 1 summarizes their maximum absorption, FWHM and peak to valley ratio.

| λ(nm) | FWHM(nm) | P/V |
|---|---|---|
| 1541 | 89 | 5.3 |

Figure 2:
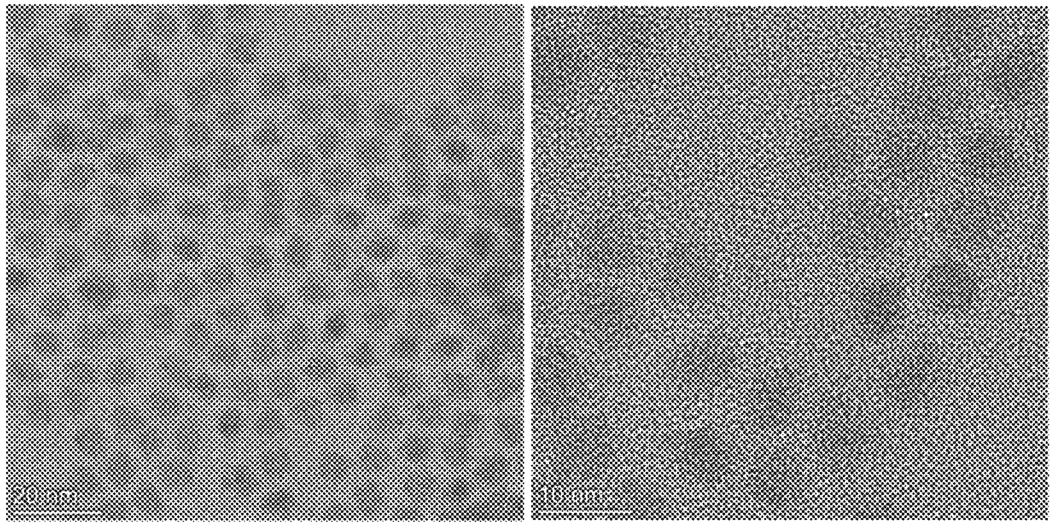
FIG. 2 shows TEM images of the PS nanocrystals prepared from $PbO_2$ lead source with FWHM = 89 nm at different magnification. Cubic structure appears dominant for the lead (IV)-based nanocrystals and the nanoparticles show high crystallinity.

FIG. 2 shows TEM images of the PS nanocrystals prepared using $PbO_2$ lead source with λ=1541 nm, FWHM=89 nm at different magnification. Cubic structure appears dominant for the lead (IV)-based nanocrystals which also show high crystallinity.

Reference Example 2: Synthesis of PbS Nanocrystals Using Pb(II,IV) Oxide ($Pb_3O_4$) and Multiple Addition of $(TMS)_2S$ 2.4 g (10.50 mmol Pb) $Pb_3O_4$ and 20 mL (56.70 mmol) oleic acid were added to a 50 mL three neck-round bottom flask. The mixture was degassed under vacuum then held under a nitrogen atmosphere for 60 min at 230° C. to produce lead (II, IV) oleate solution. After the clear light brown oleate solution was formed, the temperature was reduced to about 40° C. and 1.07 g (0.556 mml) of the lead(IV)oleate solution was used to add to a 100 mL three neck round bottom flask containing 13.50 mL previously degassed octadecene (ODE). The mixture was further degassed under vacuum at 90° C. for 30 min and kept under nitrogen at 100° C. 0.8 mL of the $1^{st}$ $(TMS)_2S$ stock solution in degassed ODE ($(TMS)_2S$ to ODE equal to 1/8 v/v) was injected. After 7 min reaction at 100° C., 0.8 mL of the $2^{nd}$ $(TMS)_2S$ stock solution in degassed ODE ($(TMS)_2S$ to ODE equal to 1/12 v/v) was added and the reaction mixture changed from light to dark brown within next few minutes indicating nanocrystals formation and growth. 0.8 mL of the 2 nd $(TMS)_2S$ stock solution was then added every 5 min until target absorption wavelength was obtained. The reaction was then cooled down to room temperature (20° C.-30° C.) and the PbS nanocrystals were purified through precipitation and re-dispersion in in access (four times volume) acetone/methanol and hexane respectively. The nanocrystals were then re-dispersed in required solvents such as n-hexane, n-octane or toluene.

Figure 3:
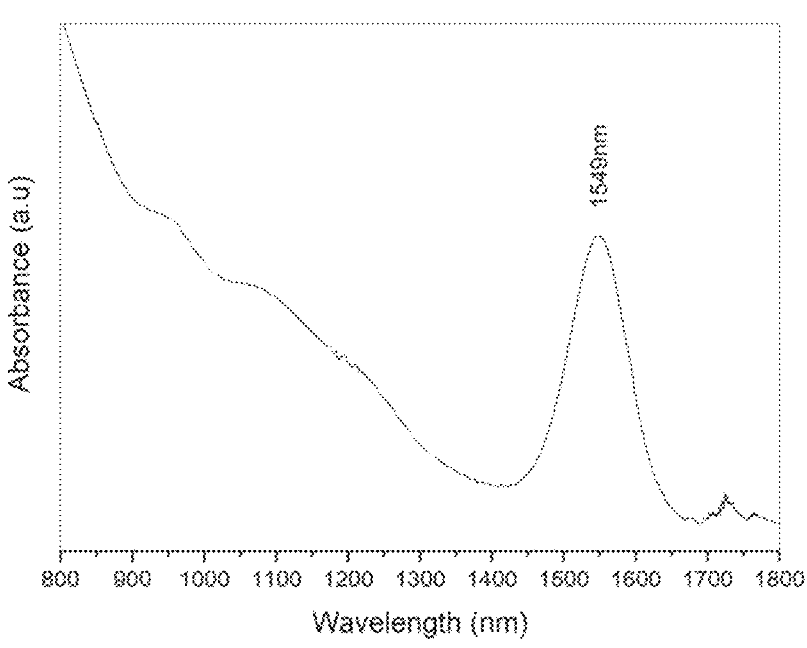
FIG. 3 shows absorption spectra of PbS nanocrystals using $Pb_3O_4$ as lead source and the $(TMS)_2S$ multiple additions.

FIG. 3 shows absorption spectrum of PbS nanocrystals using $Pb_3O_4$ as lead source and $(TMS)_2S$ multiple additions. Table 2 summarizes their maximum absorption, FWHM and peak to valley ratio.

| λ(nm) | FWHM(nm) | P/V |
|---|---|---|
| 1549 | 94 | 4.76 |
| 1556 | 92 | 4.88 |

It can be seen that, compared to the production of PbS nanocrystals using $Pb_3O_4$, the production of PbS nanocrystals using $PbO_2$ produces higher P/V ratios at similar absorption wavelengths. Similarly, the production of PbS nanocrystals using $PbO_2$ produces lower FWHM values than the corresponding production of PbS nanocrystals using $Pb_3O_4$.

Figure 4:
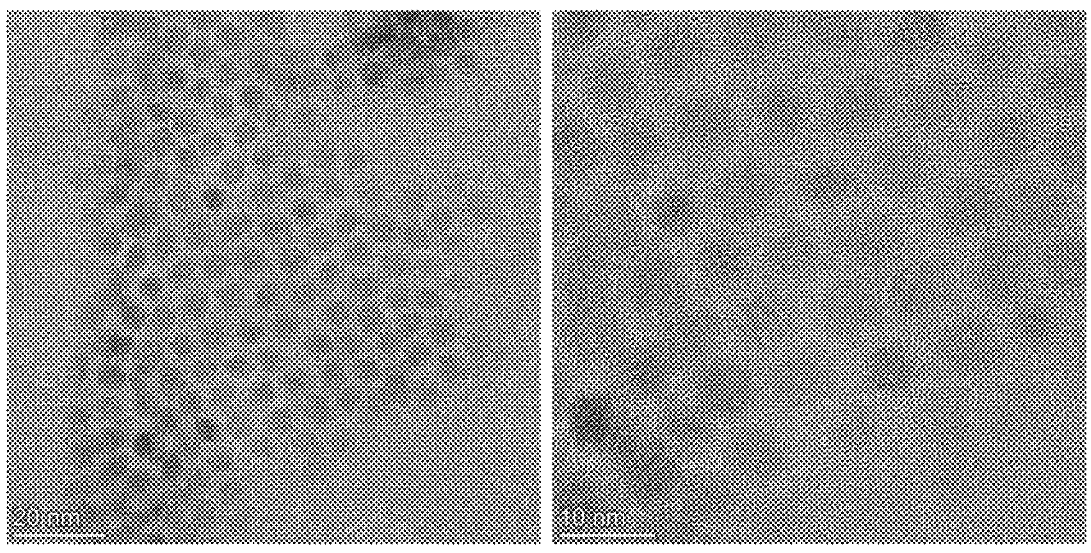
FIG. 4 shows TEM images of the PS nanocrystals prepared from $Pb_3O_4$ lead source with FWHM = 94 nm at different magnification. Spherical structure appears dominant for the lead (II, IV)-based PbS nanocrystals and the nanoparticles show high crystallinity.

FIG. 4 shows TEM images of the PS nanocrystals prepared using $Pb_3O_4$ as lead source with λ=1549 nm, FWHM=94 nm at different magnifications. Near spherical or rounded edge structure appears dominant for the lead (II, IV)-based nanocrystals which also show high crystallinity.

Reference Example 3: Synthesis of PbS Nanocrystals Using Pb(II) Oxide (PbO) and Multiple Addition of $(TMS)_2S$ 1.17 g (5.24 mmol Pb) $Pb_3O_4$ and 20 mL oleic acid (28.40 mmol) were added to a 50 mL three neck-round bottom flask. The mixture was degassed under vacuum then held under a nitrogen atmosphere for 60 min at 150° C. to produce lead oleate solution. After the clear light brown oleate solution was formed, the temperature was reduced to about 40° C. and 1.07 g (0.556 mmol Pb) of the lead (II) oleate solution was used to add to a 100 mL three neck round bottom flask containing 13.50 mL previously degassed octadecene (ODE). The mixture was further degassed under vacuum at for 30 min and kept under nitrogen at 100° C. 0.8 mL of the $1^{st}$ $(TMS)_2S$ stock solution in degassed ODE ($(TMS)_2S$ to ODE equal to 1/8 v/v) was injected. After 7 min reaction at 100° C., 0.8 mL of the 2 nd $(TMS)_2S$ stock solution in degassed ODE ($(TMS)_2S$ to ODE equal to 1/12 v/v) was added and the reaction mixture changed from light to dark brown within next few minutes indicating nanocrystals formation and growth. 0.8 mL of the 2 nd $(TMS)_2S$ stock solution was then added every 5 min until target absorption wavelength obtained. The reaction was then cooled down to room temperature (20° C.-30° C.) and the PbS nanocrystals were purified through precipitation and re-dispersion in in access (four times volume) acetone/methanol and hexane respectively. The nanocrystals were then re-dispersed in required solvents such as n-hexane, n-octane or toluene.

Figure 5:
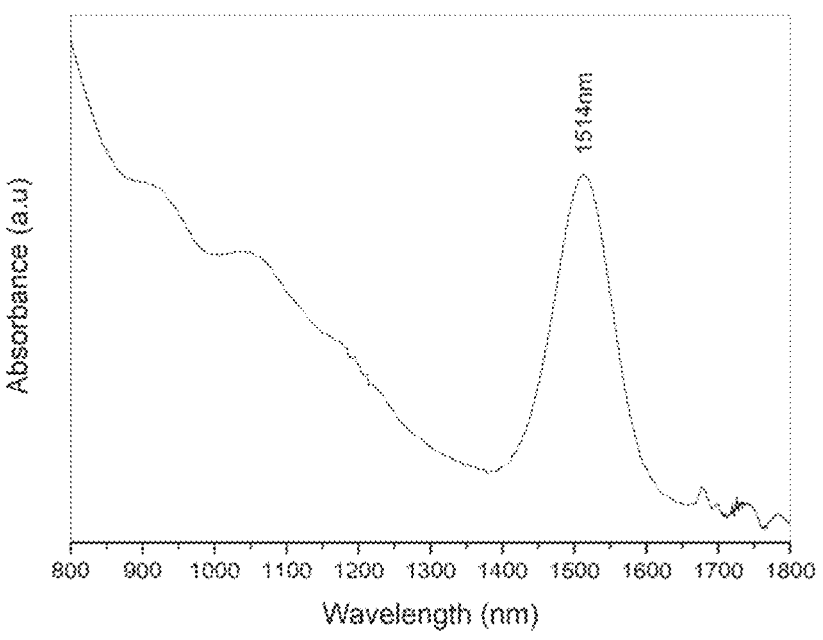
FIG. 5 shows absorption spectra of PbS nanocrystals using PbO as lead source and the $(TMS)_2S$ multiple additions.

FIG. 5 shows absorption spectrum of PbS nanocrystals using PbO as lead source and $(TMS)_2S$ multiple additions.

Table 3 summarizes their maximum absorption, FWHM and peak to valley ratio.

| λ(nm) | FWHM(nm) | P/V |
|---|---|---|
| 1514 | 92 | 5.00 |

As with PbS nanocrystals produced using $Pb_3O_4$, the production of PbS nanocrystals using PbO produces lower P/V ratios at similar absorption wavelengths compared to PbS nanocrystals produced using $PbO_2$. Similarly, the production of PbS nanocrystals using $PbO_2$ produces lower FWHM values than the corresponding production of PbS nanocrystals using PbO.

Figure 6:
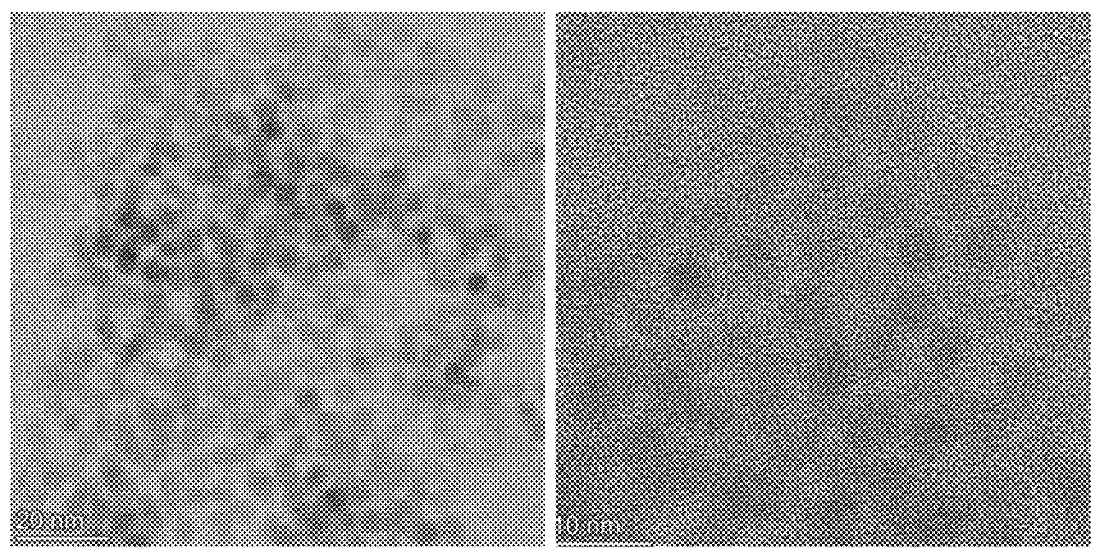
FIG. 6 shows TEM images of the PS nanocrystals prepared from PbO as the lead source with FWHM = 91 nm at different magnification. Spherical or rounded edge structure appears dominant for the lead (II)-based PbS nanocrystals and the nanoparticles show high crystallinity.

FIG. 6 shows TEM images of the PS nanocrystals using PbO as lead source at different magnifications. Near spherical or rounded edge structure appears dominant for the lead (II)-based nanocrystals which also show high crystallinity.

Example 4: Surface Passivation of PbS Nanocrystals with Halide Salt and Storage Stability of the Resultant Colloidal PbS Quantum Dots The procedure is summarized as in Scheme 1, which illustrates the preparation of PbS nanocrystals using Pb(IV) oxide as lead source and surface passivation reaction.

Surface of PbS nanocrystals were treated with different halide salts to improve their storage stability and thermal stability.

PbS nanocrystals were synthesized as outlined above in Examples 1. The typical procedure for surface passivation reaction is as follows. After PbS nanocrystals reached the required absorption wavelength, the reaction mixture was rapidly cooled to 60° C. and 1 mL of 0.19M halide salts such NaCl, NaI, $NH_4Cl$ in degassed methanol was added dropwise to the reaction mixture of 1.07 g lead oleate (0.556 mmol Pb) while stirring under nitrogen. The passivation reactions could proceed for 30 min to and the resultant nanocrystals were purified with acetone and methanol as the non-solvents. The obtained solids were dispersed in required solvent such as n-octane. The obtained solids were dispersed in required solvent such as n-octane. The obtained dispersions might need to further centrifuge to remove unwanted solid (excess salt) precipitation. The halide treated nanocrystals typically show approximate redshift compared to untreated PbS nanocrystals (see Table 4).

TABLE 4

Stability of untreated and halide treated PbS nanocrystals dispersion in air and room temperature.

| Batch | Storage time (day) | λ(nm) | FWHM (nm) | P/V ratio |
|---|---|---|---|---|
| Untreated PbS nanocrystals | 0 | 1375 | 91 | 5.4 |
| | 1 | 1359 | 92 | 5.1 |
| | 9 | 1302 | 84 | 6.4 |
| | 23 | 1285 | 83 | 6.0 |
| | 42 | 1279 | 83 | 6.7 |
| NaCl treated PbS nanocrystals | 0 | 1448 | 91 | 6.3 |
| | 1 | 1450 | 90 | 6.0 |
| | 14 | 1448 | 90 | 6.3 |
| | 28 | 1445 | 89 | 5.3 |
| | 47 | 1442 | 89 | 5.8 |

Figure 7:
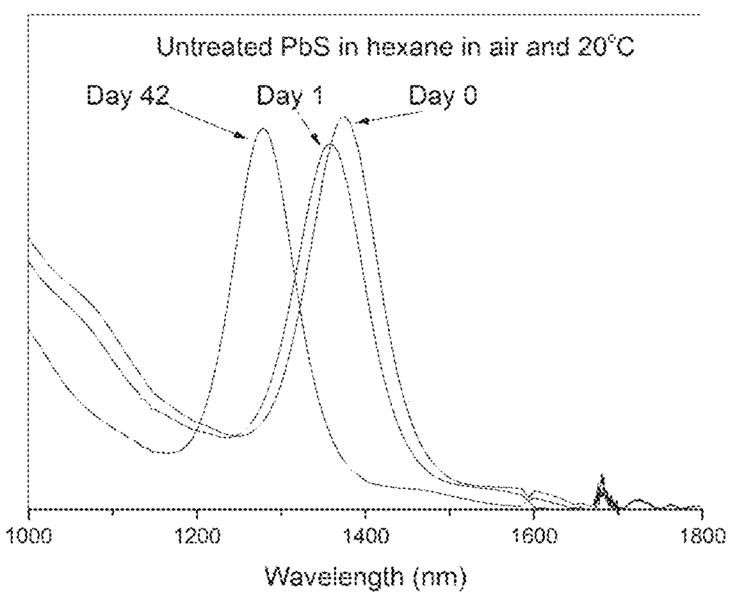
FIG. 7 shows Time dependent absorption spectra of PbS nanocrystals dispersion in hexane stored in absence of light and in air and at room temperature. The nanocrystals showed significant blue shift after 42 days storage indicating nanocrystals were involved in oxidation reaction.
Figure 8:
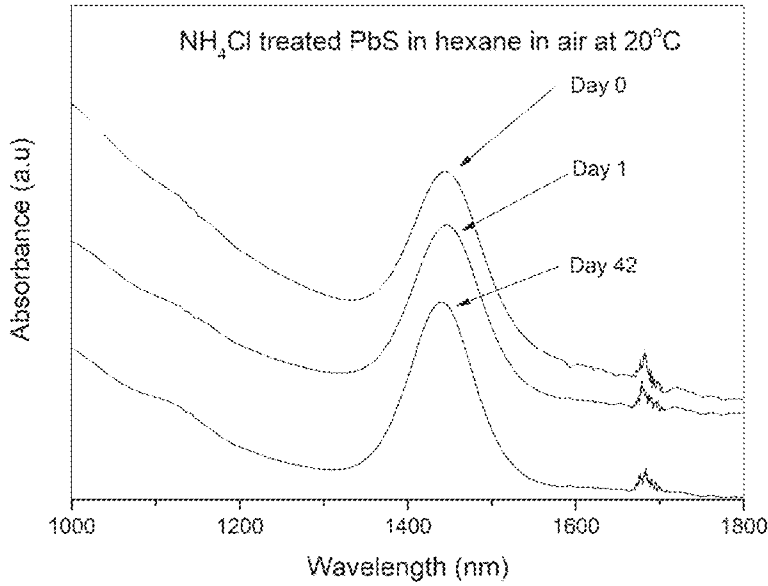
FIG. 8 shows absorption spectra of ammonium chloride treated-PbS nanocrystals dispersion in hexane in the dark and in air and at room temperature appear unchanged along with the storage time. This suggests that surface lead atoms of nanocrystals are covalently bound with halide protecting the nanocrystals from (photo) oxidation.

FIGS. 7 and 8 show the absorption spectra of untreated and $NH_4Cl$ treated PbS nanocrystals dispersed in hexane and stored in air at room temperature (20° C.).

Table 4 compares stability of halide salt treated and untreated PbS nanocrystals. Without halide salt passivation, the PbS nanocrystals show 96 nm blue shift after 42 days stored in air and at room temperature suggesting the nanocrystals were subject to the oxidation reaction. In contrast, halide passivated PbS nanocrystals show only 6 nm blue shift after the same time under the same storage conditions.

Example 5: Film Formation of PbS Nanocrystals and their Thermal Stability

The synthesis outlined above in Examples 1 was repeated. The PbS nanocrystal surface was passivated with halide as in Example 4. Thin films of PbS and were prepared using spin coating of dispersions of PbS nanocrystals in n-hexane, n-octane or toluene on a glass slide.

Figure 9:
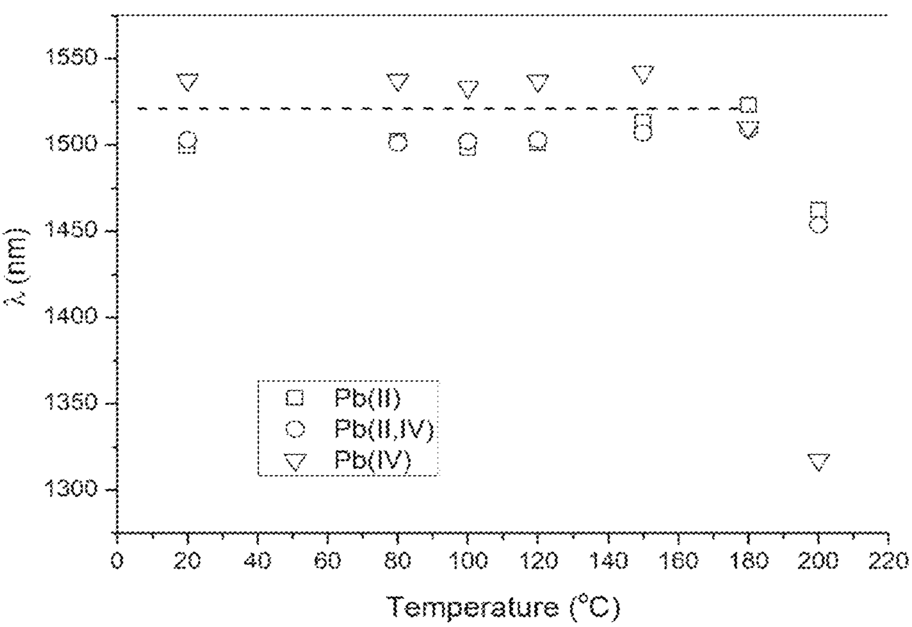
FIG. 9 shows the maximum absorption wavelength (λ) of PbS nanocrystal films upon heating at different temperatures. The nanocrystals were prepared from Pb (II), Pb (IV), Pb (II, IV) lead source and $(TMS)_2S$ multiple addition. No blue shift was observed when films were heated to 180° C.

For thermal stability study, spin coating films on glass slides with thickness in the range of 200 nm were heated on hotplate in air at different temperature and their film absorption wavelength and FWHM were monitored. FIGS. 9 and 10 show the change of films absorption wavelength and FWHM of PbS prepared using lead (II), lead (IV) and lead (II,IV) as the lead source and (TMS)S.

Example 6—Synthesis of PbS Quantum Dots 6.1—PbS Quantum Dots from Lead (II) Oxide PbO (0.1723 g, 0.772 mmol) was charged into a 3-necked RBF equipped with a magnetic stirring bar and a condenser. The system was evacuated on a Schlenk line and placed under N2, triplicating vacuum cycles. Oleic acid (1.465 mL, 4.15 mmol) was then injected into the flask and degassed thrice at room temperature, holding the vacuum for 10-minute intervals. The temperature was then increased to form lead oleate, which began to occur at 115° C. The temperature was further increased to 150° C. where it was held for 15 minutes to complete the reaction. 20 mL of dry, degassed octa-1-decene (ODE) was then injected into the lead oleate solution and the temperature allowed to plateau at 100° C. for 30 minutes. 1.18 mL of a 0.093 M solution of $(TMS)_2S$ in ODE was then injected at once into the lead oleate solution. The solution was seen to blacken at 40 seconds after the injection. After 7 minutes, 1.28 mL of a 0.033 M solution of $(TMS)_2S$ in ODE was injected at once into the lead oleate solution. After an additional 5 minutes, the reaction was quenched in an ice-water bath before reaction flask was sealed and purged into the glovebox. 12.5 mL aliquots of the reaction solution were combined with anhydrous IPA (30 mL) and centrifuged (4.5k, 3 mins) to precipitate the product. The precipitates were combined in anhydrous hexanes (~5 mL) and anhydrous IPA (10 mL) was added before centrifuging (4.5k, 3 minutes). The IPA wash was repeated before the precipitates were dissolved in anhydrous octane (5 mL). A final centrifuge was performed to remove insoluble precipitates and the supernatant containing the purified product was stored in the glovebox under $N_2$.

6.2—PbS Quantum Dots from Lead (IV) Oxide $PbO_2$ (0.1847 g, 0.772 mmol) was charged into a 3-necked RBF equipped with a magnetic stirring bar and a condenser. The system was evacuated on a Schlenk line and placed under $N_2$, triplicating vacuum cycles. Oleic acid (1.465 mL, 4.15 mmol), was injected into the flask and degassed thrice at room temperature, holding the vacuum for 10-minute intervals. The temperature was then increased to form lead oleate, which began to occur at 200° C. The temperature was further increased to 220° C. where it was held for 15 minutes to complete the reaction. 20 mL of dry, degassed octa-1-decene (ODE) was then injected into the lead oleate solution and the temperature allowed to plateau at 100° C. for 30 minutes. 1.18 mL of a 0.093 M solution of $(TMS)_2S$ in ODE was then injected at once into the lead oleate solution.

The solution was seen to blacken at 40 seconds after the injection. After 7 minutes, 1.28 mL of a 0.033 M solution of $(TMS)_2S$ in ODE was injected at once into the lead oleate solution. After an additional 5 minutes, 0.15 mL of a 0.033 M solution of $(TMS)_2S$ in ODE was injected at once into the lead oleate solution. After 3 minutes, the reaction was quenched in an ice-water bath before reaction flask was sealed and purged into the glovebox. 12.5 mL aliquots of the reaction solution were combined with anhydrous IPA (30 mL) and centrifuged (4.5k, 3 mins) to precipitate the product. The precipitates were combined in anhydrous hexanes (~5 mL) and anhydrous IPA (10 mL) was added before centrifuging (4.5k, 3 minutes). The IPA wash was repeated before the precipitates were dissolved in anhydrous octane (5 mL). A final centrifuge was performed to remove insoluble precipitates and the supernatant containing the purified product was stored in the glovebox under $N_2$.

6.3—Characterisation of Examples 6.1 and 6.2

Absorption spectra of PbS quantum dots were obtained on a JASCO V-770 UV-visible/NIR spectrometer which can provide measurements in the 400 to 3200 nm wavelength range.

The High-Resolution Transmission Electron Microscope (HRTEM) characterisations were conducted on a FEI (Thermo Fisher) Talos FX200A transmission electron microscope equipped with high brightness electron source (200 kV super-X field emission gun—FEG). The images from TEM characterisation were recorded with a CETATM 16M (4096×4096 pixel) CMOS camera. Atomic resolution images of nanoparticles were obtained in a high-resolution transmission electron microscopy (HRTEM) mode of the microscope from which lattice fringes of nanocrystals are visible. TEM images were analysed with digital micrograph (Gatan Digital Micrograph 2.3) and the analysis of crystals orientation was done with CrysTbox.

PbS CQDs with similar maximum absorption wavelength (1330-1340 nm) and band gap (0.92-0.93 eV) were synthesised (according to Example 6) using different lead oxide precursors, as summarized in Table 5.

TABLE 5

Peak absorption wavelength and band gap of quantum dots prepared from lead (II) and lead (IV) oxide.

| Samples | $\lambda_{max}$ (nm) | Eg (eV) |
|---|---|---|
| Lead (II) oxide-based PbS quantum dots | 1330 | 0.93 |
| Lead (IV) oxide-based PbS quantum dots | 1340 | 0.92 |

The shape of PbS colloidal quantum dots (CQDs) changes from octahedral toward cubic as their size (or absorption wavelength) increases. In particular, smaller PbS CQDs (<3 nm; Eg>1.3 eV) show octahedral shapes dominated by (111) facets. As the CQDs size increases, the (100) facet is expected to form gradually, altering the (111) shape facet-only octahedron to the (111) and (100) truncated octahedron and cuboctahedron. The (111) facet is lead-rich and polar while the (100) facet is of lower surface energy and non-polar. HRTEM images of PbS CQDs prepared from lead (II) and lead (IV) are shown in FIGS. 11 and 12 respectively.

It should be noted that the (200) and (002) facets are in the (100) group with interplanar spacing of ca 0.29 nm, the (022) facet is in (110) group. The (111) and (−111) facets have interplanar spacing of ca. 0.35 nm.

As can be seen in FIG. 11, PbS CQDs made from lead (II) oxide precursors according to the present invention are in truncated octahedral crystals, with visible (002), (111) and (−111) facets. PbS CQDs made from lead (IV) show a significantly higher proportion of cuboctahedrons as the major shape (FIG. 12A-D). The (002), (111) facets are major whilst the (022) facet is sometimes visible in cuboctahedral crystals of lead (IV) PbS CQDs.

Lead (IV) PbS CQDs having larger proportion of cuboctahedrons should have a higher area of the non-polar, lower surface energy (100) facets than the only truncated octahedral crystals based on lead (II) dots. The increase in (100) facet areas of lead (IV) CQDs at similar maximum absorption wavelength and bandgap to lead (II) CQDs can result in higher packing density of CQDs via (100)-(100) coupling, thereby improving charge transport in films comprising said CDQs. In fact, Sargent and co-workers reported that both hole mobility and time response in PbS photodetectors could be improved by surface modification making (100) facet dominant to increase coupling[1]. By directly measuring facet-dependent electrical properties of an n-type large PbS nanocrystal, Tan and co-workers reported that both (110) and (100) facets are highly conductive while the (111) facets can remain nonconductive even at 5 V[2]. These demonstrate that lead (IV) PbS CQDs provide better charge transport compared to lead (II)-based PbS, resulting in higher performance, especially in optoelectronic devices.

In conclusion, the nanocrystals and nanocrystal compositions of the present invention have some improved electronic properties compared to equivalent nanocrystals and nanocrystal compositions made from Pb(II) and Pb(II, IV) reagents. Said nanocrystals adopt a different morphology compared to prior art materials made from made from Pb(II) and Pb(II, IV) reagents. Other properties such as stability were at least as good as the equivalent nanocrystals and nanocrystal compositions made from Pb(II) and Pb(II, IV) reagents.

REFERENCES

1. Biondi et al. Facet-Oriented Coupling Enables Fast and Sensitive Colloidal Quantum Dot Photodectectors Adv. Mater 2021, 33, 2101056; https://doi.10.1002/adma.202101056
2. Tan et al, Facet-dependent electrical conductivity properties of PbS nanocrystals, 2016; http://doi.org/10.1021/acs.chemmater.6b00274

The invention claimed is:

1. A method for producing a lead chalcogenide nanocrystal, the method comprising contacting a lead (IV) containing compound starting material with an organic acid and a chalcogen-containing reagent,
- wherein the lead (IV) containing compound has a molar ratio of lead (IV) to lead (II) of greater than 1:1,
- wherein the lead (IV) containing compound is contacted with the organic acid to produce a lead salt and the lead salt is contacted with the chalcogen-containing reagent,
- wherein the organic acid is a fatty acid, and
- wherein the chalcogen-containing reagent is selected from a sulphur-, selenium- and tellurium-containing reagent, and mixtures thereof.

2. The method according to claim 1, wherein the lead (IV) containing compound comprises lead (IV) oxide.

3. The method according to claim 1, wherein no lead (II) containing compounds are present in the starting material.

4. The method according to claim 1, which is conducted in the presence of a non-polar or a polar solvent.

5. The method according to claim 1, which comprises:
- forming a first solution of the lead (IV) containing compound and organic acid in a first solvent;
- forming a second solution of the chalcogen-containing reagent in a second solvent;
- heating the first solution to a first temperature in the range of from 120 to 250° C. and maintaining the first solution at the first temperature for a predetermined length of time;
- reducing the temperature of the first solution to a reduced temperature in the range of from 20 to 100° C.
- adding the second solution to the first solution at the reduced temperature to produce a reaction mixture;
- maintaining the reaction mixture at a temperature of from 20 to 300° C. for a predetermined length of time.

6. The method according to claim 5, wherein the chalcogen-containing reagent comprises bis(trimethylsilyl) sulphide.

7. The method according to claim 1, which comprises:
- forming a first solution of the lead (IV) containing compound and organic acid in a first solvent;
- heating the first solution to a first temperature in the range of from 120 to 250° C. and maintaining the first solution at the first temperature for a predetermined length of time;
- providing the first solution at a second temperature in the range of from 50 to 150° C.;
- adding the chalcogen-containing reagent to the first solution at the second temperature to produce a reaction mixture;
- maintaining the reaction mixture at a temperature of from 50 to 300° C. for a predetermined length of time.

8. The method according to claim 7, wherein the chalcogen-containing reagent comprises thioacetamide.

9. The method according to claim 1, wherein the nanocrystals comprise quantum dots.

10. The method according to claim 1, wherein the molar ratio of lead (IV) oxide to any lead (II) oxide present is greater than 2:1.

11. A method for producing a lead chalcogenide nanocrystal, the method comprising contacting a lead (IV) containing compound starting material with an organic acid and a chalcogen-containing reagent, wherein the lead (IV) containing compound is contacted with the organic acid to produce a lead salt and the lead salt is contacted with the chalcogen-containing reagent, wherein the organic acid is a fatty acid, and wherein the chalcogen-containing reagent is selected from a sulphur-, selenium- and tellurium-containing reagent, and mixtures thereof.

* * * * *